US009098479B2

(12) United States Patent
Kahn

(10) Patent No.: US 9,098,479 B2
(45) Date of Patent: Aug. 4, 2015

(54) METHODS AND APPARATUS FOR IMPROVED NAVIGATION AMONG CONTROLLED TERMS IN ONE OR MORE USER DOCUMENTS

(75) Inventor: Rocky Kahn, Oakland, CA (US)

(73) Assignee: Edyt Inc., Oakland, CA (US)

(*) Notice: Subject to any disclaimer, the term of this patent is extended or adjusted under 35 U.S.C. 154(b) by 2267 days.

(21) Appl. No.: 12/032,183

(22) Filed: Feb. 15, 2008

(65) Prior Publication Data

US 2009/0210828 A1  Aug. 20, 2009

(51) Int. Cl.
*G06F 15/00* (2006.01)
*G06F 13/00* (2006.01)
*G06F 17/24* (2006.01)
*G06F 17/27* (2006.01)

(52) U.S. Cl.
CPC .......... *G06F 17/241* (2013.01); *G06F 17/2735* (2013.01); *G06F 17/2795* (2013.01)

(58) Field of Classification Search
CPC ............................ G06F 17/241; G06F 17/2735
USPC ......... 715/751–753, 851–853, 765–768, 797, 715/790, 700
See application file for complete search history.

(56) References Cited

U.S. PATENT DOCUMENTS

| | | | |
|---|---|---|---|
| 5,745,360 A | 4/1998 | Leone et al. | |
| 5,924,104 A | 7/1999 | Earl | |
| 6,425,016 B1 | 7/2002 | Banavar et al. | |
| 7,559,034 B1* | 7/2009 | Paperny et al. | 715/803 |
| 2008/0086356 A1* | 4/2008 | Glassman et al. | 705/10 |

OTHER PUBLICATIONS iClaim by Brux Software.
Lexis PatentOptimizer.
Microsoft Word 2003, MSWord Bookmarks.
Adobe Acrobat search.
Metacarta, http://geosearch.metacarta.com/.
Integrated Development Environments (IDEs).
Intellisense, Wikipedia, http://en.wikipedia.org/wiki/IntelliSense.
HippieExpand, http://www.emacswiki.org/cgi-bin/wiki/HippieExpand.
Aurigin Systems Integrates Cartia ThemeScape with its Intellectual Property Asset Management System, Jul. 20, 1999, http://www.highbeam.com/doc/1G1-55197722.html.
Aurigin Systems and IBM Form an E-Commerce and Marketing Alliance for Electronic Distribution and E-Commerce, Sep. 15, 1998, http://www.encyclopedia.com/doc/1G1-21129892.html.
Inventorprise, Inc. PatentEase Deluxe (v7.0.0).
I/P Updates, "Mighty Macro" Patent Helper, http://ip-updates.blogspot.com/2004/09/mighty-macro-patent-helper.html.

* cited by examiner

*Primary Examiner* — Kevin Nguyen
(74) *Attorney, Agent, or Firm* — Ryan, Mason & Lewis, LLP

(57) ABSTRACT

Methods and apparatus are provided for improved navigation among controlled terms in one or more user documents. A user can navigate among a plurality of occurrences of a controlled term in one or more documents. A disclosed navigation and editing tool provides a link for each of the occurrences of the controlled term, wherein each of the links include a plurality of destination links, wherein each of the destination links allow a user to navigate to a corresponding one of the other of the plurality of occurrences in the one or more documents; receives a user selection of at least one of the destination links; and jumps, in response to the user selection, to a destination in the one or more documents associated with the selected destination link.

45 Claims, 22 Drawing Sheets

FIG. 2A

```
200:
<a id="89040930" class="tpRefToken" tokentype="r" tokentext="manual
control device" tokennum="42" orphan="f" _djrealurl="#_tpToken"
href="#_tpToken"> <img style="border: medium none ;" alt="manual
control device 42"_istptoken="true"/></a>
```

FIG. 2B

```
250:
<A class="tpRefToken" id="1550558737" contentEditable="false"
href="https://teampatent.com/commonpage.php#_tpToken" tokentype="r"
tokentext="manual control device" tokennum="42"
orphan="f"_djrealurl="#_tpToken">manual control device 42</A>
```

The illustrated manual control device 42 is a push button switch but alternatively can be any suitable type of switch. The manual control device's 42 outputs are operably connected to the controller 36 so that the user can selectively adjust the braking force applied by the brake 18. It is noted that there can be multiple manual control devices 42.

FIG. 4

400 the illustr manual control devic 42 is a push button switch but altern can be any suitabl type of switch the manual control devic 42 output are oper connect to the control 36 so that the user can select adjust the brake forc appli by the brake 18 it is note that there can be multipl manual control devic 42

FIG. 5

```
                                                    ┌─500
┌──────────────────────────────────────────────────┐
│ The illustrated manual control device 42 is a push button
│ switch but alternatively can be any suitable type of switch. The
│ manual control device's 42 outputs are operably connected to
│ the controller 36 so that the user can selectively adjust the
│ braking force applied by the brake 18. It is noted that there can
│ be multiple manual control devices 42.
└──────────────────────────────────────────────────┘
```

FIG. 6

```
                                                    ┌─600
┌──────────────────────────────────────────────────┐
│ The illustrated manual control device 42 is a push button
│ switch but alternatively can be any suitable type of switch. The
│ manual control device's 42 outputs are operably connected to
│ the controller 36 so that the user can selectively adjust the
│ braking force applied by the brake 18. It is noted that there can
│ be multiple manual control devices 42.
└──────────────────────────────────────────────────┘
```

FIG. 7

```
                                                    ┌─700
┌──────────────────────────────────────────────────┐
│ The illustrated manual control device 42 is a push button
│ switch but alternatively can be any suitable type of switch. The
│ manual control device's 42 outputs are operably connected to
│ the controller 36 so that the user can selectively adjust the
│ braking force applied by the brake 18. It is noted that there can
│ be multiple manual control devices 42.
└──────────────────────────────────────────────────┘
```

FIG. 8

```
                                                    ┌─800
┌──────────────────────────────────────────────────┐
│ The illustrated manual control device 42 is a push button
│ switch but alternatively can be any suitable type of switch. The
│ manual control device's 42 outputs are operably connected to
│ the controller 36 so that the user can selectively adjust the
│ braking force applied by the brake 18. It is noted that there can
│ be multiple manual control devices 42.
└──────────────────────────────────────────────────┘
```

FIG. 9

```
┌─ 900
│ The illustrated manual control device 42 is a push button
│ switch but alternatively can be any suitable type of switch.
│ The illustrated manual control device's 42 outputs are operably
│ connected...
```

FIG. 10

```
┌─ 1000
│        The illustrated manual control device 42 is a push button switch...
│               The manual control device's 42 outputs are operably connected
│ ...there can be multiple manual control devices 42
```

FIG. 11

```
┌─ 1100
│     The illustrated manual control device 42      is a push button switch...
│           The manual control device's 42          outputs are operably connected
│ ...there can be multiple manual control devices 42
```

FIG. 12

```
┌─ 1200
│              Manual Control Device 42
│       The illustrated 42 is a push button switch...
│               The 42 outputs are operably connected
│ ...there can be multiple 42
```

FIG. 13

Controlled Term List Presentation Process – 1300

```
if tokennum already recognized
        if preceded by recognized label
                tokenize whole term
        else
                insert previously recognized controlled term else (new tokennum)
        tokenize new controlled term
end
```

FIG. 20 attached bilaterally to allow the

[0026] The massage controller or computer 36 is preferably of the programmable type and is operably connected to the brake 18 for adjustment thereof. During operation, the controller 36 actuates the brake 18 so that a desired shear force is provided to the user 12 by the !roller 22!. The controller 36 receive signals from the detector 34* and when the controller 36 determines that the !roller 22!* is in a slipping condition, the controller 36 autom... 2000
brake 18 ...ed.
The brak... e
manner s...
pulses of
and/or gr... aking
force.

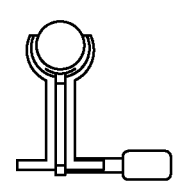

Fig. 8: Other views
>> Second Embodiment    edit
Text Reference¶s:
Brief Desc.: 18
Detailed Desc.: 27 34
Annotator  Remove Link  Brief Desc.

[0027] !FIG. 13! illustrates a variation of the massage device of FIG. 8 wherein the control system includes a manual control device 42. The illustrated manual control device 42 is push-type

| | VARIANT | | RESULT |
|---|---|---|---|
| ■ | manual control device 42 | → | manual control device 18 |
| RENAME JUST THIS INSTANCE | | | |
| ■ | Manual control device 42 | → | Manual control device 18 |
| ■ | manual control device's 42 | → | manual control device's 18 |
| ■ | manual control devices 42 | → | manual control devices 18 |
| RENAME CHECKED | | | |

FIG. 23

| | VARIANT | | RESULT |
|---|---|---|---|
| ■ | manual control device 42 | → | switch 42 |
| RENAME JUST THIS INSTANCE | | | |
| ■ | Manual control device 42 | → | Switch 42 |
| RENAME CHECKED | | | |
| ☐ | manual control device's 42 | → | <enter selection> |
| ☐ | manual control devices 42 | → | <enter selection> |

FIG. 25

```
┌─────────┬─────────┬──────┬───┬───┐
│ Doc Map │ Orphans │ Find │ 🔒│ ? │── 2510
└─────────┴─────────┴──────┴───┴───┘
View: [ Figures ] [ References ] [ Text ]

Figures mentioned in the application:

| Num▲ | Name |

⊟ 1    Overview > Massage Device
         ⊟ References (16):
             10: massage device
             12: user
             14: support member
             16: rotatable manipulator
             18: brake
             20: rotational axis
             22: roller
             24: piston and cylinder assembly
             26: brake pad
             28: translator
             30: movable carriage
             32: control system
             34: detector
             36: controller
             38: strain gauge
             40: base ⊟ Text - Brief Description (1):
             [10] FIG. 1 is an elevational view of...

⊟ Text - Detailed Description (5):
             [21] FIG. 1 illustrates a massage...
             [27] FIG. 2 illustrates a variation of...
             [28] FIG. 3 illustrates another...
             [29] FIG. 4 illustrates another...
             [30] FIG. 5 illustrates yet another...
             [32] FIG. 6 illustrates an automatic...
             [33] FIG. 7 illustrates a chiropractic...

⊟ 2    an elevational view of a device...
⊟ 3    an elevational view of a device...
⊟        .
⊟        .
⊟        .
```

FIG. 27

```
┌─────────────────────────────────────────────── 2700
│ Detailed Description:
│ ...the illustrated manual control device is a push button switch...
│ Claims:
│ ...including a manual control device as well as...
└───────────────────────────────────────────────
```

FIG. 28

```
┌─────────────────────────────────────────────── 2800
│ Detailed Description:
│ ...the illustrated manual control device 42 is a push button switch...
│ Claims:
│ ...including a manual control device as well as...
└───────────────────────────────────────────────
```

FIG. 29

```
┌─────────────────────────────────────────────── 2900
│ Detailed Description:
│ ...the illustrated manual control device 42 is a push button switch...
│ Claims:
│ ...including a manual control device as well as...
└───────────────────────────────────────────────
```
(In FIG. 29, "manual control device 42" and "manual control device" are underlined.)

*FIG. 30A*

- 3005: Edit step terminated by user.
- 3010: Parse changed text region including words immediately preceding and following changed region (note, tokens recognized in preceding or following contextual text must overlap with changed region).
- 3015: Look for numbered terms
  - 3020: Find all positive integer numbers preceded by a potentially valid term name, separated by a space. Also followed by a non-alphanumeric character to the right.
  - 3025: If integer has already been recognized in a numbered symbol,
    - 3030: if name is same as already recognized term or is automatically-recognizable variant
    - 3035: Tokenize and recalculate orphan status. Copy conflict status from said preexisting symbol.
    - 3040: Else (name preceding number unrelated to said preexisting symbol) (This symbol conflicts in number with another symbol)
      - 3045: tokenize as "ambiguous length"
      - 3050: Tokenize related symbols (e.g., variants) through entire document
      - 3055: Mark them all as conflicting with preexisting term.
  - 3060: Else (integer hasn't yet been recognized)
    - 3065: tokenize as ambiguous length.
    - 3070: tokenize numbered variants of this term throughout document
    - 3075: tokenize unnumbered variants of this term throughout document.

3080: Search for unnumbered terms in changed text region
- 3084: Group preexisting tokens by number of words in name (ignore number).
- 3088: Start with group with largest number of words and then iterate to smaller number of words.
- 3092: Search for each term name and related variants in text range. If found, tokenize this unnumbered term.

3094: Clicking on term allows user to adjust term extent or to untokenize the term.

3096: When user clicks on ambiguous length token and changes length, search for all instances of this term including unnumbered token text and apply a similar adjustment. Include text in already tokenized unnumbered terms if current search term consists of more words than such previously tokenized unnumbered terms.

3098: When user clicks on an unnumbered token (which is tagged with a separate class from whatever numbered tokens it might match), show all related numbered symbols.

FIG. 31

FIG. 31 illustrates a massage device 19 for manipulating and/or massaging a recipient or user 2 according to a first embodiment of the present invention. The illustrated massage device 19 includes a support member 14, a rotatable manipulator 3 adapted to engage and to apply a shear force to the user 2, and a brake 8 operably connected to the manipulator 3 to selectively adjust rotation of the manipulator 3 whereby a magnitude of the shear force applied to the user 2 by the manipulator 3 is adjusted.

FIG. 32

FIG. 1 illustrates a massage device 20 for manipulating and/or massaging a recipient or user 22 according to a first embodiment of the present invention. The illustrated massage device 20 includes a support member 24, a rotatable manipulator 26 adapted to engage and to apply a shear force to the user 22, and a brake 28 operably connected to the manipulator 26 to selectively adjust rotation of the manipulator 26 whereby a magnitude of the shear force applied to the user 22 by the manipulator 26 is adjusted.

METHODS AND APPARATUS FOR IMPROVED NAVIGATION AMONG CONTROLLED TERMS IN ONE OR MORE USER DOCUMENTS

FIELD OF THE INVENTION

The present invention relates generally to techniques for navigating and editing documents, and more particularly, to improved techniques for navigation among, and editing of, controlled terms in one or more user documents.

BACKGROUND OF THE INVENTION

Drafting high quality documents is often a significant challenge. In many document domains, such as in the drafting of patent applications, it is important that terms are used consistently throughout one or more documents. Maintaining consistent term usage, however, can often be a challenge, especially across multiple document sections or when multiple authors collaborate in drafting various portions of the same document or set of related documents. Adhering to high standards of consistency can often divert the attention of the author from the more substantive and intellectually-satisfying aspects of drafting the documents.

A number of tools have been proposed or suggested to improve the efficiency of the document drafting process and to encourage consistent term usage. For example, a number of document drafting tools exist that allow the author to insert previously recognized terms from a list into the text or drawings (or both). While such existing document drafting tools have improved the efficiency of the document drafting process, they suffer from a number of limitations, which if overcome, could further improve the efficiency and consistency of the document drafting process. For example, inconsistent term usage may be acceptable in some situations. Differences attributed to capitalization, pluralization or possessive usage, for example, are often accepted variants to recognized terms. Existing document drafting tools, however, do not provide the necessary flexibility to allow an author to employ accepted variants to recognized terms.

In many document domains, the documents must satisfy one or more rules that are consistent with "good practices" for the domain. When drafting a patent application, for example, it is important that (i) elements in the claims section are supported by a corresponding discussion in the description section; (ii) all claim elements must be shown in the figures; and (iii) all controlled terms in the claims should employ proper antecedent basis.

A need exists for improved systematic techniques for ensuring consistent term usage. A further need exists for an improved document drafting tool that provides improved navigation among various instances of one or more recognized terms. Yet another need exists for improved systematic techniques for ensuring adherence to accepted rules of good practice for a document domain.

SUMMARY OF THE INVENTION

Generally, methods and apparatus are provided for improved navigation among controlled terms in one or more user documents. According to one aspect of the invention, a user can navigate among a plurality of occurrences of a controlled term in one or more documents. A navigation and editing tool in accordance with an aspect of the present invention provides a link for each of the occurrences of the controlled term, wherein each of the links include a plurality of destination links, wherein each of the destination links allow a user to navigate to a corresponding one of the other of the plurality of occurrences in the one or more documents; receives a user selection of at least one of the destination links; and jumps, in response to the user selection, to a destination in the one or more documents associated with the selected destination link.

Various embodiments of the invention support text and/or drawing documents. If occurrences of the controlled term appear in both a text document and a drawing, the user can optionally jump between the occurrences in the text document and the occurrences in the drawing. A portion of a text document can be mapped to a corresponding drawing such that a version of the corresponding drawing is presented to the user when the user focuses on the document portion.

In addition, if a user selects the link for a given occurrence of the controlled term, a version of a corresponding drawing document can be presented to the user. For example, if the given occurrence of the controlled term is a drawing token, the corresponding drawing document is a drawing identified by the drawing token. Likewise, if the given occurrence of the controlled term is an element token, the corresponding drawing document is a drawing containing an element associated with the element token. The corresponding drawing can optionally be represented in an alternative scale supported by a gliphing process such that the drawing token is presented with an alternative representation that is more easily discerned in the alternative scale. The corresponding drawing document containing an element associated with the element token can optionally be presented such that the version of the drawing containing the element associated with the element token hides or deemphasizes elements in the drawing other than the selected element.

According to another aspect of the invention, the jumping step further comprises the step of adjusting the focus of at least one of the one or more documents to a region of the at least one document containing an occurrence of the controlled term identified by the selected destination link.

According to yet another aspect of the invention, the user can be presented, in response to a user activating one of the links, with a list of the other occurrences in the one or more documents associated with the activated link. The presented list can optionally group the occurrences into at least two variant types.

According to yet another aspect of the invention, each of the plurality of occurrences of a controlled term are tokenized. In one implementation, each of the tokenized occurrences of the controlled term have a common token identifier. In addition, token boundaries of each of the tokenized occurrences of the controlled term can be associatively saved with document. Furthermore, the token boundaries for each of the controlled terms can be persistently stored between at least two sessions. In a further variation, token boundaries of each of the tokenized occurrences of the controlled term can be stored as metadata in the one or more documents.

The tokenized occurrences of the controlled term can be identified using one or more manual or automated processes, such as a sniffing process. For example, if the tokenized occurrences of the controlled term are automatically identified, a user can manually adjust an extent of the automatically identified tokenized occurrence. In addition, a user can request to (i) de-tokenize at least one of the tokenized occurrences of the controlled term; or (ii) edit at least one of the tokenized occurrences of the controlled term (which can optionally trigger an update of each of the additional occurrences of the controlled term based on the edit, optionally with selective editing of variant usages of the controlled term).

According to another aspect of the invention, a given one of the links associated with a first occurrence of the controlled term and the plurality of destination links associated with the given link are bidirectional, such that activating a link associated with an occurrence identified by one of the plurality of destination links (i) includes a link back to the first occurrence, and/or (ii) provides information about a location of the first occurrence.

Another aspect of the invention allows a user to insert at least one occurrence of the controlled terms in a document from a list of the controlled terms. The presented list can optionally be filtered to match user-specified text.

According to yet another aspect of the invention, occurrences of the controlled term are evaluated to determine if one or more predefined rules of good practice are satisfied. A visual indicator can optionally be provided if one of the controlled terms violates one or more of the predefined rules of good practice. In an exemplary patent application, for example, the predefined rules of good practice can ensure one or more of: (i) the controlled term is not an orphan term; and (ii) each of the controlled terms in a claims portion of a patent application employ proper antecedent basis.

Additional aspects of the invention allow a user to trigger an automatic renumbering of reference numbers that may be part of the controlled terms and to explicitly relate two terms as related occurrences of a controlled term. Finally, when the document is a drawing document having a drawing and one or more overlaid drawing tokens, a user can optionally replace the drawing with another drawing and maintain the one or more overlaid drawing tokens A more complete understanding of the present invention, as well as further features and advantages of the present invention, will be obtained by reference to the following detailed description and drawings.

BRIEF DESCRIPTION OF THE DRAWINGS

FIG. 1 illustrates a user interface for a navigation and editing tool that provides many-to-many navigation links in accordance with an aspect of the present invention;

FIGS. 2A and 2B illustrate exemplary hypertext links for exemplary implementations of a navigation and editing tool for the exemplary screenshot of FIG. 1;

FIGS. 3 through 9 illustrate various exemplary text fragments that are processed by a tokenization process incorporating features of the present invention;

FIGS. 10 through 12 illustrate an exemplary concordance format for displaying a list of a number of instances of a controlled term;

FIG. 13 provides illustrative pseudo-code for an exemplary implementation of a controlled term list presentation process incorporating features of the present invention;

FIG. 20 illustrates an exemplary clickover that is activated from a figure token to display information about the figure token and/or navigation links to other instances of the corresponding figure token and to the figure itself;

FIGS. 22 and 23 illustrate an exemplary technique incorporating aspects of the invention for modifying all instances of a token "class" that has variants;

FIG. 25 illustrates an exemplary listing of tokens and their corresponding navigation links in an accessory pane;

FIGS. 27 through 29 illustrate the processing of an exemplary text fragment in order to permit tokenization of a numbered instance;

FIGS. 30A and 30B, collectively, provide illustrative pseudo-code for an exemplary implementation of a sniffing algorithm that incorporates features of the present invention;

FIGS. 31 and 32 illustrate a renumbering of an exemplary patent application passage in accordance with an aspect of the present invention.

DETAILED DESCRIPTION

Figure 33:
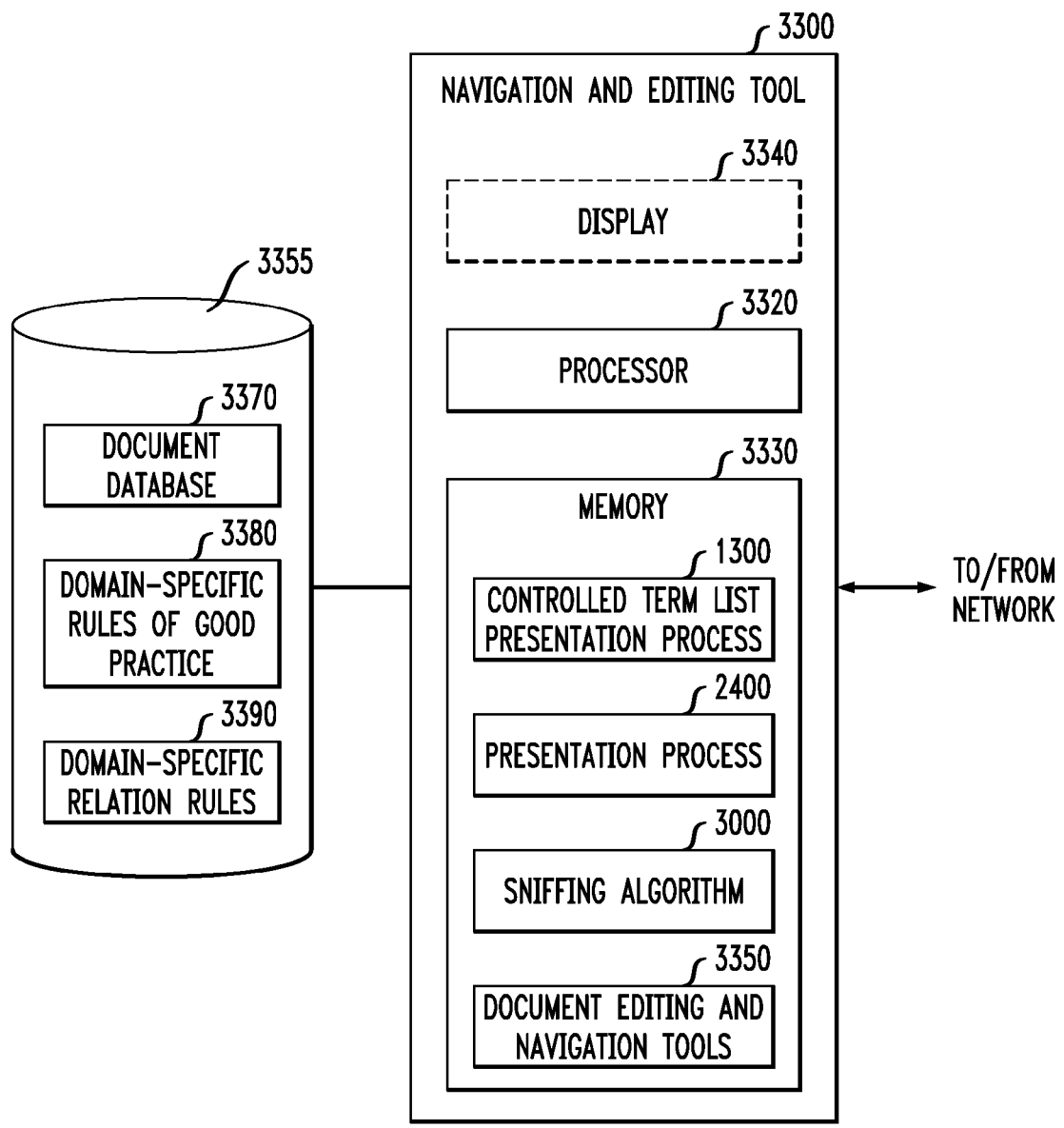
FIG. 33 is a block diagram of a navigation and editing tool that can implement the processes of the present invention.

The present invention provides an improved navigation and editing tool 3300, shown in FIG. 33, that allows a user to more efficiently edit one or more user documents and to navigate among controlled terms in one or more user documents. While the present invention is illustrated herein in the context of an exemplary browser-based text editor and drawing annotator, the present invention may be applied to any standalone, client-server, or peer-to-peer-based text and/or drawing editor or browser, as would be apparent to a person of ordinary skill in the art. In addition, while the present invention is illustrated herein in the context of a tool for editing and navigating within a patent application, the present invention may be applied to other document domains, as would be apparent to a person of ordinary skill in the art.

Navigation and Editing Terminology

Symbol Class Comprised of Related Terms

A "symbol class" (or "token class") consists of all occurrences (or "instances") recognized by the software system as members of a "related" group of elements throughout one or more documents and/or document regions that share "context" (generally, documents sharing a symbol universe share context). Symbols can comprise controlled terms (i.e., "labels" with optional "markers") and drawing labels (e.g., callouts). For example, the symbol class "plunger 18" in a patent application refers to recognized occurrences of the label "plunger" (a controlled term's "label" in a patent application is an "element" or "part name") with the number 18 in the specification and recognized callouts in drawings (e.g., "18"). In some document types, text boxes including controlled terms may appear in drawings. Controlled terms can be "marked" and/or "unmarked". For example, a symbol class in a patent application can comprise the marked terms "plunger 18" in a patent specification, "plunger 18" or "18" in a patent drawing, and the unmarked term, "plunger," in the patent claims (as well as accepted variants thereof). In a patent application, "marked" terms are those followed by a reference number and "unmarked" terms are those without a reference number. Thus, the term "marked" in this document domain is synonymous with "numbered." In the general case, "markers" allow the system to more reliably detect controlled terms and, if applicable, to distinguish between symbol classes with the same label (the "label" is the controlled term excluding the marker).

The determination of whether one term is "related" to another term may vary with the document type or domain. In a patent application, for example, different occurrences of a term such as "plunger 18" with minor variations, such as "Plunger 18" (a capitalization difference), "plungers 18" (a pluralization difference), and "plunger's 18" (a possessive case difference), would be considered to be "related" terms and therefore should be treated as part of the same symbol class.

If the marked controlled terms in a document context for a given label share the same marking, recognized occurrences of matching unmarked controlled terms in the document context may be treated as the same symbol, a separate symbol, or a superclass encompassing the numbered term's class. For example, if all parts in a patent application with the label "plunger" are numbered 18, then unnumbered occurrences of "plunger" in the claims section may be considered part of the numbered symbol's class. On the other hand, if, in a document context, there are multiple controlled terms with the same label but different markers (e.g., "plunger 18" and "plunger 20"), then each term is a separate, "unrelated" symbol class. Unnumbered occurrences (e.g., "plunger") may then constitute a separate, "unrelated" symbol class or a superclass encompassing both numbered symbol classes (e.g., encompassing both "plunger 18" and "plunger 20"). In one exemplary embodiment, predefined relation rules that are appropriate for the document domain, can specify whether different occurrences of terms with minor variations should be treated as the same symbol or a separate symbol. Such predefined relation rules can optionally be overridden by a user. It is noted that unrecognized controlled terms and drawing labels are generally not considered symbols until they are recognized. The act of recognizing a controlled term or drawing label as a symbol is referred to herein as "tokenization," discussed further below in conjunction with FIGS. 30A and 30B.

Terms with major variants (i.e., those terms that cannot be automatically determined to be related) may still be explicitly related. When a user wishes to relate terms that vary more substantially (e.g., "Department of Defense" being equivalent to the acronym, "DoD"), the user may do so by using the same marker characters (e.g., the same token number) that allow the system to automatically relate the token occurrences. For example, "Department of Defense 14" is related to "DoD 14." The occurrences may at first be presented to the user as a likely conflict (i.e., inconsistent usage) which can then be validated by the user. The validation can be stored in the document's metadata or an external dictionary.

Unnumbered terms with major variants may also be explicitly related to recognized numbered and/or unnumbered occurrences. For example, if the user tokenizes a term including a parenthetical, the contents of the parenthetical can be determined to be related to the non-parenthetical label. For example, the user tokenizing "Department of Defense (DoD)" allows this compound term to be automatically related to both "Department of Defense" and to "DoD." This relational metadata can be stored in the text itself rather than hidden metadata or an external dictionary. Additional relations can be formed by listing multiple terms in the parentheses, such as "Department of Defense (DoD, DeptOfDefns)."

Terms may be related to each other hierarchically (i.e., one term is a subclass of another class). For example, tokenizing a compound term separated by a slash or another appropriate designation may indicate that the second term is a subclass of the first. For example, tokenizing the compound term "valve assembly/plunger" indicates that "valve assembly" and "plunger" are symbol classes which are related hierarchically. For example, activating the plunger subclass may allow the user to navigate to its parent superclass or vice versa.

"Marked Terms" are Generalized Embodiment of "Numbered Terms"

As used herein, the phrase "marked terms" indicates symbols that include one or more "marker characters" that designate a word or phrase as related members of a particular symbol class. In a patent application, for example, these marked terms are often referred to as "numbered terms" that employ positive integers following an element name, separated by a space, as a marker character to indicate that they are part of a symbol class. In other document types, these marker characters can vary. For example, in the Python programming language, the marker characters can consist of a class or object name followed by a period and followed by the symbol label in question. For example, "self.userChange" indicates that userchange is a tokenizable symbol label related to other userchange methods attached to the "self" object. The context of symbols in a programming domain depends on many language-specific variables such as class/function nesting, includes, and global scoping. For example, a symbol occurrence may be related if it appears inside a function and unrelated if it is outside that function. Unlike this programming example, embodiments of the present invention relate to document types where the marker characters are not completely reliable. For example, in a patent application, a number preceeded by a word does not always denote a symbol (e.g., there isn't an element in the phrase "in the following 2 embodiments"). Programming languages, by contrast, unambiguously distinguish symbols from non-symbols. Embodiments of the present invention also relate to situations where the "width" or "extent" of the symbol is not easily determined. For example, it is subjective whether the tokenizable extent of "illustrated manual control device 42" should be the entire phrase or narrower ranges such as "manual control device 42", "control device 42", or just "device 42." Programming languages, by contrast, unambiguously distinguish the width of symbols.

As previously indicated, marker characters associate marked occurrences as related members of a symbol class. Two terms lacking marker characters (such as unnumbered terms in the claims of a patent application) may be determined to be related to each other and, in some cases, to matching numbered terms when at least one of the following is true: (i) the first controlled term occurrence represents the same concept (depending on the document's intent) as the second controlled term; (ii) the occurrences are recognizable by typical users to represent the same item (i.e., the label of the terms are identical except for trivial variations, such as "plunger", "plungers", and "plunger's"); and (iii) the label of the terms are equivalent when conflated by an automatic stemmer (such as Snowball, available at http://snowball.tartarus.org/).

Bidirectional Hypertext Links

Controlled terms are a type of symbol supported by various embodiments of the present invention. An embodiment of the present invention allows users to visualize the usage of controlled terms throughout a document and to navigate between those occurrences. In one embodiment, this is accomplished by displaying the controlled terms as hypertext links. Activating a hypertext link displays (such as via a clickover, popup or dialog box) a list of where else in the document context that controlled term is used and provides links to navigate to those occurrences.

FIG. 1 shows two views 110, 120 into the same text section of an exemplary patent application with clickovers 130, 140 from two instances of the same hypertext link symbol class (e.g., "manual control device 42"). According to one aspect of the present invention, the exemplary clickovers 130, 140 provide many-to-many navigation in accordance with an aspect of the present invention. As used herein, the term "many-to-many navigation" indicates that a plurality of occurrences of a controlled term in a document context each have navigation links (hereafter referred to as hyperlinks) that allow the user to navigate to each of the other occurrences of the controlled term. In one exemplary implementation, the disclosed hyperlinks allow the user to navigate to each of the other occurrences of the controlled term in the document context in a minimum number of user-mediated steps. In a patent application, for example, the document context may comprise the specification (text) and figures. As used herein, the term "navigate" or "navigation" indicates that the focus of the document jumps to the destination associated with the hyperlink. The "focus" of the document may be, for example, an insertion point, selection range, or another point or region of interest to the user. In one embodiment, the document focus can be determined using known gaze detection techniques.

In this manner, when a user activates a hyperlink associated with an occurrence of a controlled term, the user is presented with a list, such as a clickover 130, 140, identifying the other occurrences of the controlled term. If the user selects one of the other occurrences of the controlled term from the presented list, the document focus shifts to the selected occurrence. If the destination occurrence is not in the source document, the destination document loads and shifts focus (e.g., by scrolling or panning/zooming) to show the destination occurrence in an appropriate context.

The exemplary clickovers 130, 140 allow the user to selectively view the list of the other occurrences of the controlled term in the figures and in the text, for the exemplary patent application embodiment, by selecting "Figure view" and "Text view," respectively. The exemplary clickovers 130, 140 show that the controlled term "manual control device 42" appears in two paragraphs in the text. When the "Text View (2)" is selected, the clickover 130 specifies that the text references appear in the Detailed Description section of the document four times in paragraph 2 (using the notation "2(4)") and one time in paragraph 3 (corresponding to the paragraph numbers preceeding each paragraph in the main edit window of the exemplary patent specification). The notation "2(4)" is shown in boldface to provide an exemplary visual indication of the occurrence that is currently in focus. Activating a hypertext link, such as link 150, in paragraph 2 of view 110, shows clickover 130 with the paragraph 2 instances bolded to indicate the current position. As shown in view 120, activating a hypertext link, such as link 160, in paragraph 3 shows clickover 140 with the paragraph 3 instance bolded to indicate the current position.

Tokenization Process

As previously indicated, the act of recognizing a controlled term or drawing label as a symbol is referred to herein as "tokenization." According to various embodiments of the present invention, discussed hereinafter, the tokenization process can be a manual process, an automatic process following an initial manual tokenization or a fully automatic process that optionally allows for manual corrections, or a combination of the foregoing. For illustrative purposes, an exemplary sniffing process 3000 is discussed further below in conjunction with FIGS. 30A and 30B, that implements a tokenization process, for example, after a user has entered or modified a region of text. Among other functions, the sniffing process 3000 tokenizes a controlled term and identifies and tokenizes related occurrences of the controlled term. In addition, the sniffing process 3000 optionally creates one or more persistent data records for recording information (including metadata) about a tokenized controlled term. Metadata provides an indication that a given token is a recognized controlled term and the extent of the token. In one embodiment, each of the occurrences of a controlled term are maintained in relationship to each other. For example, if an occurrence is moved or deleted, the related occurrences automatically update the links that are provided to the moved or deleted occurrence.

For example, the data records may be stored as hypertext markup (e.g., appearing as hyperlinks) or as records in a custom dictionary. In this manner, any information provided by the user for a given controlled term, such as user modifications to automatically generated information, is maintained for future access. FIGS. 2A and 2B illustrate exemplary hypertext links 200, 250 for illustrative implementations using a Firefox™ browser and a Microsoft Internet Explorer™ browser, respectively, for the screenshot example of FIG. 1. As shown in FIGS. 2A and 2B, the hypertext links 200, 250 are tagged with, for example, a unique identifier (ID), a class indicating whether the symbol is fully specified (e.g., for a patent application the controlled term must appear in both the detailed description and as a callout in a drawing), the token label (tokentext), and the token number (tokennum). Generally, the token number or another token identifier (such as special marker characters) allows multiple occurrences of the same controlled term to be identified in the exemplary embodiments described herein. In this manner, to facilitate grouping of related tokens, each instance of the numbered term 42 are tagged with a common tokennum tag. In the illustrative Firefox™ implementation, the hypertext link 200 employs, for example, a broken image hyperlink. Likewise, in the illustrative Internet Explorer™ implementation, the hypertext link 250 employs, for example, a content editable link.

The data in the exemplary hypertext links 200, 250 may be the definitive source of the recorded meta-information or may be cached copies of information stored elsewhere (such as in a symbol database). The indication of the text that is tokenized is specified in-line in the document, creating a token node in the document object (at least in the case of a browser-based system which uses a document object to store the document). In the case that the hypertext links 200, 250 are cached copies of information stored elsewhere, the unique ID provides a reference into a database that stores the definitive information. If the database disagrees with, for example, the token name or number, the database would overwrite those local data. An alternative embodiment would regard the token node as definitive, allowing a token database, if one exists, to function as a disposable cache.

Manual Tokenization

Consider a text display application containing a patent application being edited that includes the text fragment 300 shown in FIG. 3. The disclosed navigation and editing tool 3300 allows a user to tokenize numbered terms by selecting a text region, such as the first instance of numbered term 42, "manual control device 42," activating the tokenization function (for example, using a ctrl-k keystroke or a toolbar icon), and, if appropriate, confirming the tokenization. In a manual tokenization embodiment, the user continues to tokenize the other instances of "manual control device 42" throughout the document.

Automatic Tokenization After Initial Manual Tokenization

In a "semi-automatic" tokenization embodiment, tokenizing one instance of a term automatically tokenizes related instances, which may vary in possessive case, pluralization, and in other ways, depending on the document type. Starting with the text shown in FIG. 3, manually tokenizing one instance, say, "manual control device 42", causes the sniffing algorithm 3000 (FIGS. 30A and 30B) to tokenize the other two related instances, producing the result 500 shown in FIG. 5. The sniffing algorithm 3000 is triggered when the user manually tokenizes a term that was not, at that time, already recognized.

In this "semi-automatic" tokenization embodiment, the navigation and editing tool 3300 conflates the text portion of the newly tokenized controlled term which reduces the controlled term to its stem, such as "manual control device 42" (where the final "e" was removed from "device"). Conflation may be performed using one or more stemming tools, such as Snowball, available from http://snowball.tartarus.org. The Snowball tool can be extended to recognize a possessive, as would be apparent to a person of ordinary skill in the art. After the entire document has been stemmed, the text fragment 300 of FIG. 3 will appear as a stemmed text fragment 400, shown in FIG. 4.

The stemmed text fragment 400 is parsed for phrases that match the stemmed version of the newly tokenized phrase. In the fragment 400, two additional instances are found. The text regions of the two additional identified instances are correlated location-wise with the original text fragment 300 in FIG. 3 and tagged as hypertext links, visually distinguished in the text. Suppose after seeing the result 500, the user proceeds to similarly tokenize the term "controller 36," resulting in the updated result 600 shown in FIG. 6.

As previously indicated, the sniffing process 3000 (FIGS. 30A and 30B) implements a tokenization process, for example, after a user has entered or modified a region of text. Thus, when the user enters additional text (e.g., by typing, pasting, or importing), text regions matching any already-tokenized controlled terms may be automatically recognized by the sniffing process 3000. When sniffing a new region, if tokenized text regions are excluded from the matching algorithm, the exemplary sniffing process 3000 searches for matches to the longest already-recognized tokens and work down to shortest already-recognized tokens. If, on the other hand, tokenized text regions are included in the matching process, the algorithm start with the shortest terms and works up to the longest. For each term, the sniffing process 3000 searches for variants as well. The illustrative search scope text includes N words before and after the additional text region where N is the length of the term being searched for.

Consider an example where the user has previously tokenized the term "manual control device 42" and the document then contains an unrecognized text fragment "manual device 42." The user then inserts the word "control" between "manual" and "device" in the text fragment "manual device 42" to produce the term "manual control device 42." The automatic tokenization algorithm within the sniffing process 3000 attempts to find all previously-recognized tokens in this newly inserted text ("control") and its surrounding context. When it attempts to look for "manual control device 42" around this insertion, the algorithm considers four words before and after the insert to search for a match. The sniffing process 3000 can optionally be optimized, for example, to prevent searches from spanning a paragraph mark or other features that cannot be part of tokens.

Automatic Tokenization, Optionally Followed by Manual Corrections

In an "automatic" tokenization embodiment, the navigation and editing tool 3300 can automatically detect even the first instance of each class. If the user imports a plain text document, fully-automatic tokenization begins by stemming the document as described above and then locating all positive integers in the text that are preceded by a word (with a space separating them) and are followed by a non-alphanumeric character (e.g., a space or allowable punctuation, such as a period, quote or exclamation point). In one exemplary implementation, the selected integer is left-extend to the preceding word, generating a list of terms to be tokenized, along with pointers to each instance in the unstemmed text. If these instances are then tokenized, source text 300 is transformed to the result 700 is shown in FIG. 7. In a further variation, terms could alternatively be left-extended up to but not including the preceding determiner (e.g., articles, demonstratives, quantifiers, and cardinals) or other parts of speech or punctuation which delimit the possible extent of controlled words.

In a further variation, after stemming, the application can group instances with the same number (e.g., three instances of "device 42" which correspond to "device 42", "device's 42", and "devices 42"), and instead of simply tokenizing those one-word instances, the system can attempt to left-extend the terms. If there is more than one instance in a group, and if the same stemmed word precedes all instances of this group, the group is left-extended (e.g., "device 42" becomes "control device 42"). This process is repeated until the term cannot be further left-extended and then the application tokenizes all instances of this group to the left-extended width. The result 800 is shown in FIG. 8. The resulting calculated "width" or "extent" of the terms in each group is likely to be, though not always, correct.

If there was just one instance of a numbered term, the navigation and editing tool 3300 would have particular difficulty knowing that "device 42" should be left-extended to "manual control device 42." This may be automatically accomplished in some cases through the use of semantic analysis and/or a dictionary of common terms (such as Irwin M. Aisenberg, Attorney's Dictionary of Patent Claims (Matthew Bender)), as would be apparent to a person of ordinary skill in the art.

When used in a fully-automatic tokenization mode, an embodiment of the present invention addresses these limitations by allowing the user to adjust the "extent" (or "width") of a term (the tokenized boundaries of the hypertext link's text region). In one embodiment of the present invention, activating any instance of a token by, for example, clicking on the hyperlink, optionally allows the user to left extend or contract the tokenized extent of the term. In FIG. 7, for example, the user could click on the link for "brake 18" and left-extend the token to include the preceding word, "the brake 18." Alternatively, the user could click on any instance of "manual control device 42" and reduce the extent by one word to become "control device 42." After adjusting the extent of a single instance of a controlled term, the disclosed navigation and editing tool 3300 can optionally make the adjustment to the extent of all additional instances of the controlled term.

If the application mistakenly tokenizes a word that should not be a controlled term (e.g., "number 10 nail"), the user can activate the hypertext link and select an option to untokenize the term. This untokenization can be applied to all instances of the controlled term in the document. Note that since automatic tokenization normally occurs by sniffing just newly inserted text regions (and a small amount of surrounding context), these mistakenly tokenized phrases will not be retokenized unless the user again inserts that term. This repeated error can be prevented by either tagging the phrase as "not a token" or by storing the phrase in a dictionary of terms that should not be auto-recognized, as would be apparent to a person of ordinary skill in the art.

The auto-recognition algorithm can mistakenly extend a term too far. For example, if the document includes the word "illustrated" before each instance of a term, it may be mistakenly included in the controlled term, as shown in the text fragment 900, shown in FIG. 9. To respond to this issue, activating a multi-word hypertext link can allow the user to contract or otherwise re-specify the boundaries of the token. Documents for which controlled terms have not been previously tokenized may be tokenized by the sniffing process 3000 (FIGS. 30A and 30B) when opened for display in a browser, for example, by the fully-automatic method.

For a more detailed discussion of exemplary techniques for automatic tokenization, see, for example, Help Application of Lexis PatentOptimizer, commercially available from Lexis-Nexis, incorporated by reference herein.

Presentation Issues/User Interface

As previously indicated, in an exemplary embodiment, the token number allows multiple occurrences of the same controlled term to be identified. In this manner, to facilitate grouping of related tokens, each instance of the numbered term 42, for example, are tagged with a common tokennum tag. Likewise, instances of a different controlled term will receive a different tokennum tag.

Display Location of Matching Instances and Provide Navigation Links

A "tokennum class" is a group of recognized tokens with the same token number. As previously indicated, the many-to-many navigation feature of the present invention provides a convenient mechanism for a user to navigate from one instance of a controlled term to any other instance of the controlled term. The many-to-many navigation links can be presented to the user, for example, using a clickover format, such as the clickovers 130, 140 of FIG. 1, or another listing of links, such as in a concordance format, discussed hereinafter.

Assume, for example, that a user clicks the first of the three hypertext links numbered "42" in FIG. 8. In one embodiment, the exemplary navigation and editing tool 3300 can display a list of all instances of that numbered term in an exemplary concordance format 1000, shown in FIG. 10. The exemplary concordance format 1000 allows the context of each instance to be expressed. In the exemplary embodiment of FIG. 10, each row in the concordance table 1000 corresponds to a different instance of the controlled term in the document. As shown in FIG. 10, the bolded cell on the first row indicates that the user activated this instance. Additional columns can optionally be added to the concordance to display, for example, the section/subsection (e.g., "Detailed Description of the Invention") and/or paragraph numbers. Instances may be sorted by location (e.g., by section) and/or by variation (e.g., all instances of "manual control device 42" in one group, all instances of "manual control device's 42" in another group).

The user can activate any row in FIG. 10 to navigate to the corresponding location in the document. If, for example, the user launches the second row, the application navigates the document to that location and displays an updated list of all instances of that numbered term with the current instance bolded as shown in FIG. 11. Arrow buttons (not shown in FIG. 11) may optionally be provided to allow the user to navigate between instances.

In a further variation, shown in FIG. 12, the full symbol name may be compressed to save space, for example, by presenting only the reference number. The full symbol name can optionally be presented as a heading over the table, as shown in FIG. 12. Alternatively, an abstract symbol may suffice.

Entry of Controlled Terms From List to Ensure Consistent Usage

As previously indicated, a user can insert a new instance of a previously recognized controlled term by typing and tokenizing the term, for example, using the above-described manual or automatic tokenization methods. According to another aspect of the invention that encourages consistent usage of controlled terms, a user can insert a controlled term from a list of already recognized controlled terms. In one variation, the user can enter a sub-phrase to narrow the number of possibilities, for example, if there are a large number of recognized controlled terms, and then choose the desired controlled term from a list or, if the sub-phrase uniquely identifies one already-recognized term, the system can insert the corresponding controlled term. In this manner, misspellings are avoided. Also avoided are the entry of other variants that may not be automatically matched to a preexisting instance by the sniffing process 3000.

FIG. 13 provides illustrative pseudo-code for an exemplary implementation of a controlled term list presentation process 1300 that incorporates features of the present invention. The controlled term list presentation process 1300 may be optionally automatically initiated by the navigation and editing tool 3300 whenever a user types a number that is a recognized token number, or may be manually initiated by a user, for example, using a defined keystroke, such as ctrl-k, or a toolbar icon following the entry of a number. Alternatively, or in addition, the controlled term list presentation process 1300 can be initiated upon detection that a user has typed a predefined number of characters of text from a controlled term and the matching characters do not appear in unrecognized text. For example, if a user has typed "man" and "man" doesn't appear in unrecognized text, the user can be presented with a list of all matching controlled terms, such as "manual control device 42."

The exemplary embodiment of the controlled term list presentation process 1300 assumes that the user has entered a number and has activated the controlled term list presentation process 1300 by using a defined keystroke or a toolbar icon following entry of the number. As shown in FIG. 13, once initiated, the controlled term list presentation process 1300 determines if the entered number is already recognized as a token number. If the token number is recognized, and if the token number is preceded by a recognized label, the whole term is tokenized. If the token number is not preceded by a recognized label, then the previously recognized controlled term is inserted before the entered number. If the controlled term has one or more variants, the user can optionally be able to select the desired variant for insertion.

If the entered number is not already recognized as a token number, then the entered number is a new token number and the new controlled term is tokenized (for example, using a manual or automatic tokenization process).

In a further variation of the controlled term list presentation process 1300, the user can optionally activate a function that lists all of the controlled terms, for example, sorted by token number or alphabetically by the label portion of the controlled term. In addition, semantic analysis techniques can optionally be employed to present a ranked list of controlled terms based, for example, on the portion of the document that is currently active (for example, presenting controlled terms in the range "12xx" if the user is currently editing a portion of the document addressing FIG. 12 or presenting controlled terms based on the frequency of occurrence of the controlled terms (e.g., with most frequently used controlled terms listed first)).

Figure 14:
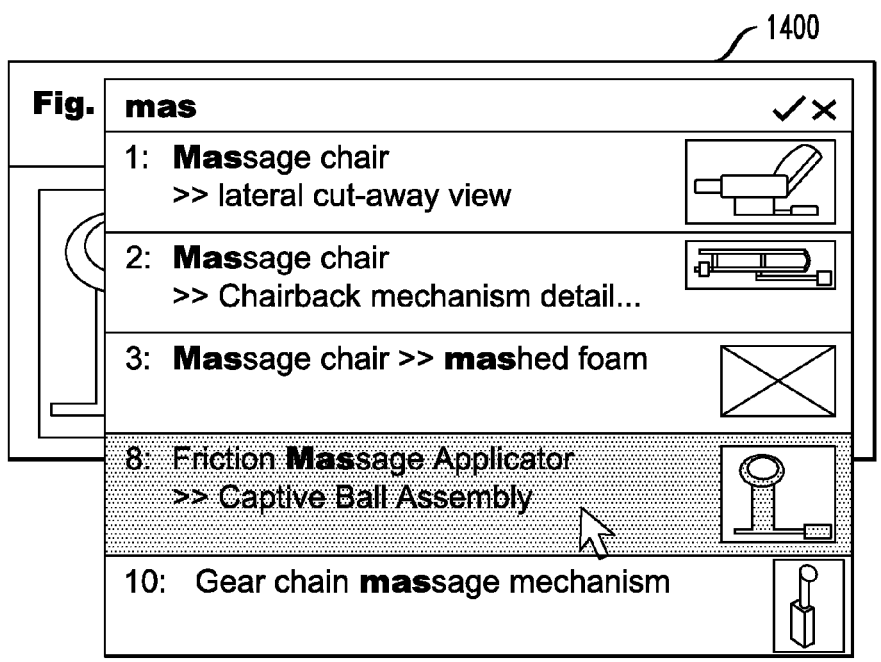
FIG. 14 illustrates an exemplary user interface for inserting a figure token using a filtered list.

FIG. 14 illustrates an exemplary user interface 1400 for inserting a figure token using a filtered list. As shown in FIG. 14, the filtered list can match user-specified text with either the brief description of the figure (e.g., from the Brief Description of Drawings section) or a nickname associated with the figure when the figure is uploaded.

Drawing Annotations

Figure 15:
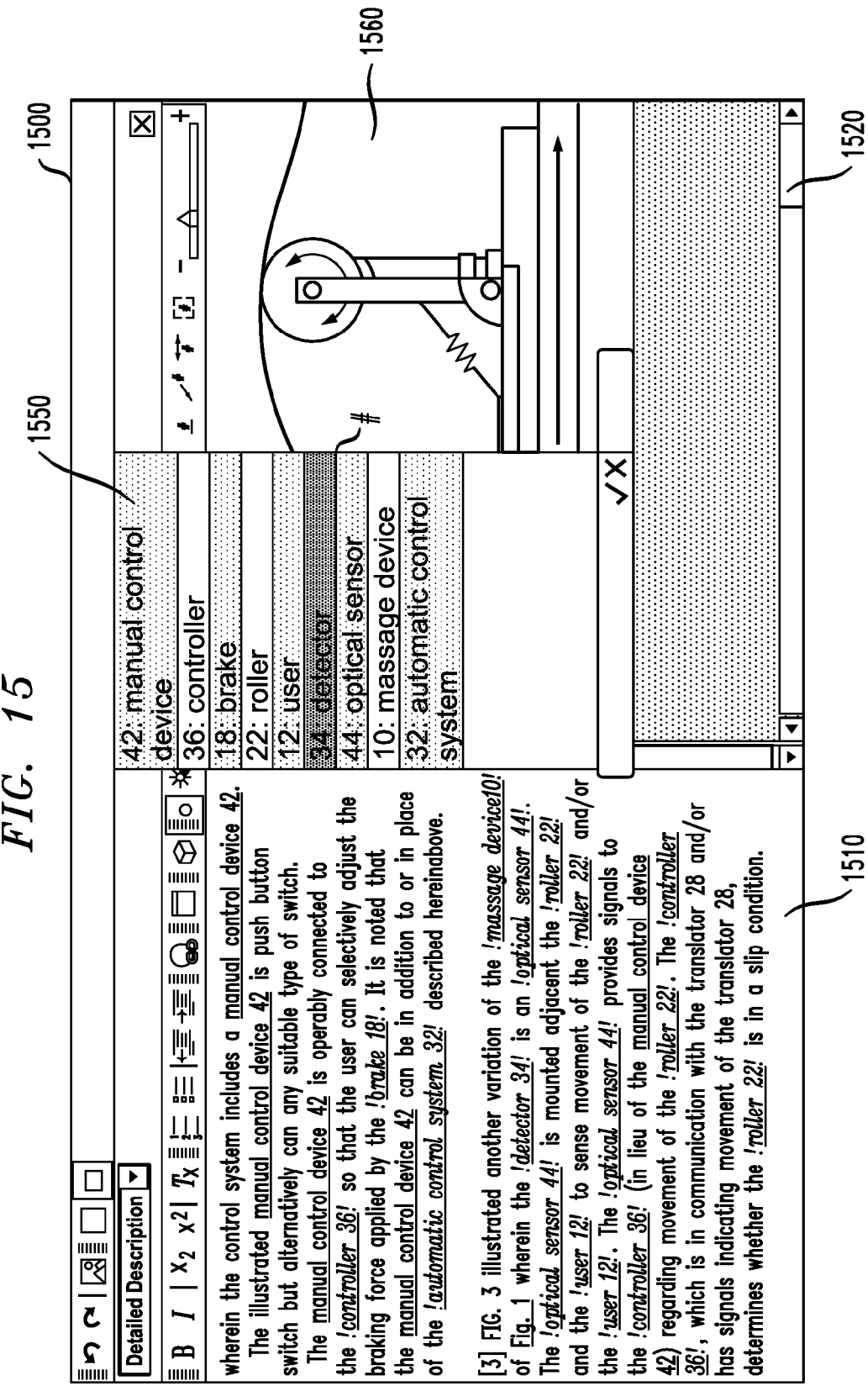
FIGS. 15 through 18 illustrate various embodiments of an exemplary editing environment for editing a drawing in accordance with the present invention.
Figure 16:
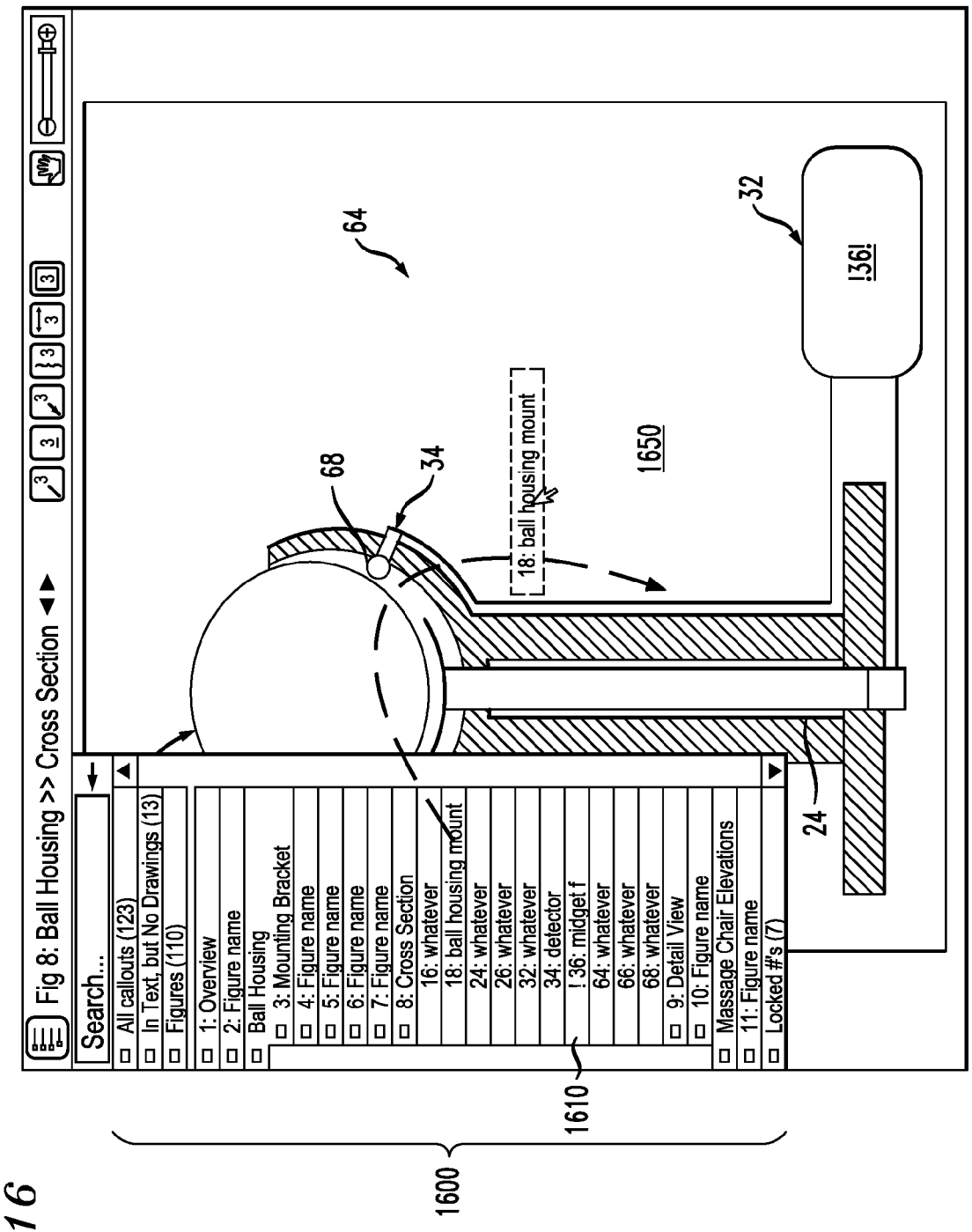

FIG. 15 illustrates an exemplary editing environment 1500 where a user is employing the navigation and editing tool 3300 to edit a text document in a first pane 1510 and to edit a drawing 1560 in a second pane 1520. The navigation and editing tool 3300 allows the user to insert tokens as callout annotations on the drawing 1560 (in addition to placement as hypertext links). For example, a user can first upload one or more vector or bitmap images, such as the image 1560 in the right pane 1520. In one exemplary embodiment, the user can place callouts in the drawing 1560 by specifying the callout style from a toolbar, and then positioning the desired callout by clicking or dragging the callout. The user can optionally specify the callout by typing it out entirely (e.g., "manual control device 42") or choosing it from a list 1550, as shown in FIG. 15. The list 1550 shown in FIG. 15 can optionally be generated using the techniques described above in conjunction with FIG. 13. The user can optionally specify a sub-phrase (e.g., "42") and the system can filter the list results allowing the user to choose from a shorter list of possibilities. Alternatively, as shown in FIG. 16, the user can drag a symbol 1610 off a list 1600 of already recognized symbols in an accessory pane to place the symbol 1610 as a callout in a desired figure 1650. The resulting callouts can be shown in a contrasting color to distinguish them from the underlying drawing as shown in FIG. 15.

Figure 17:
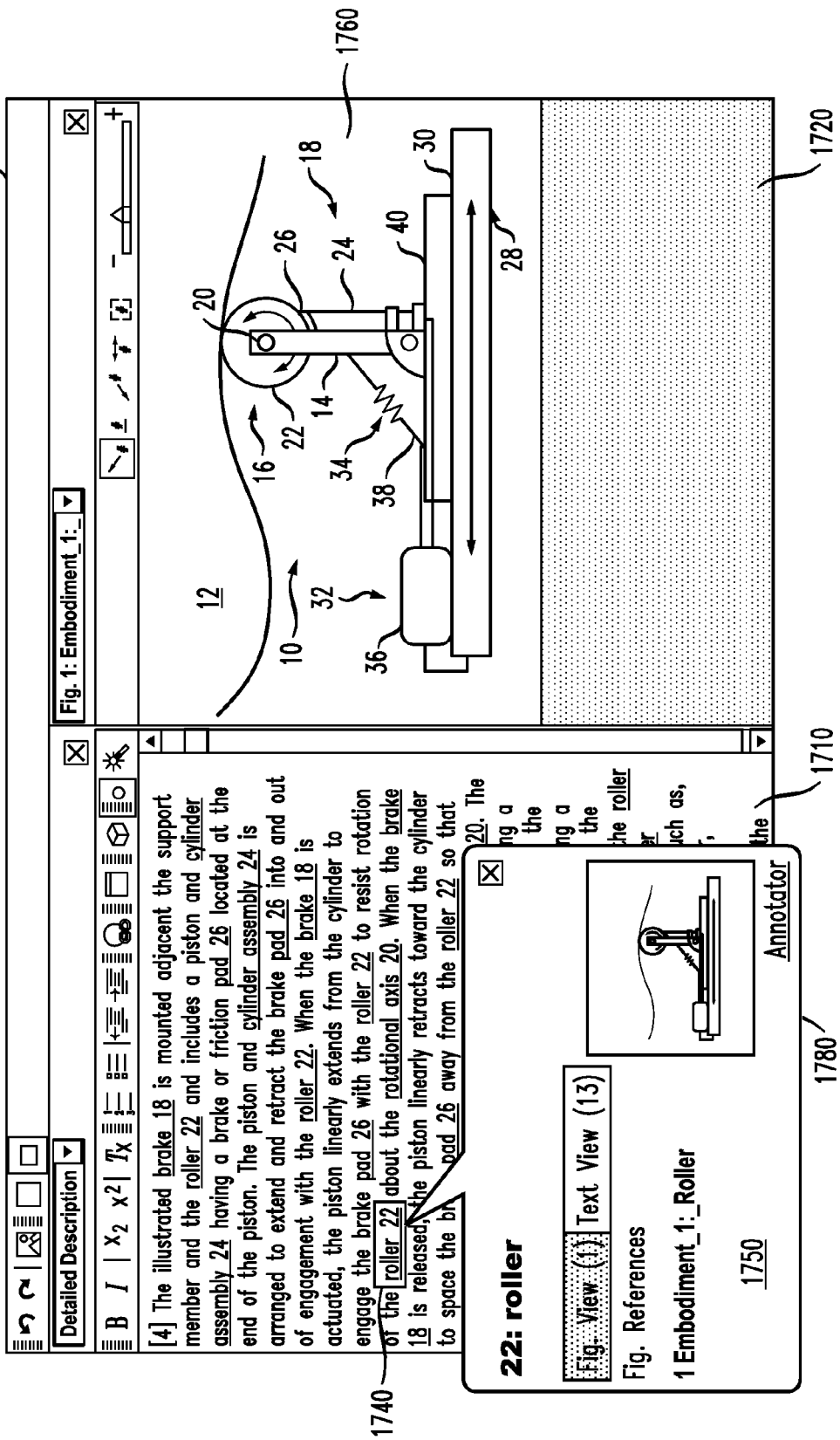

FIG. 17 illustrates an alternate view of an editing environment 1700 where a user is employing the navigation and editing tool 3300 to edit a text document in a first pane 1710 and to edit a drawing 1760 in a second pane 1720. As previously indicated, when the user activates a hypertext link in the text, such as the link 1740, a clickover dialog 1750 optionally displays all occurrences having the same token number in the text and drawings. In the example shown in FIG. 17, clickover 1750 indicates that the controlled term "roller 22" occurs in one drawing, FIG. 1, which has a caption "Embodiment_1:_ Roller," and a thumbnail 1780 of FIG. 1 is optionally shown in the clickover 1750. In the exemplary thumbnail 1780, the callout corresponding to roller 22 is optionally gliphed while the other callouts are hidden. In this manner, the user can see which aspect of the figure corresponds to the term without launching the full-size Figure 1760. The corresponding drawing document containing an element associated with the element token can optionally be presented such that the version of the drawing containing the element associated with the element token hides or deemphasizes elements in the drawing other than the selected element. Clicking on the thumbnail 1780 launches the drawing annotator with the selected figure displayed. If "roller 22" occurs on more than one figure, a list of figures would be shown and the user could click on one occurrence to navigate to the selected occurrence.

Figure 18:
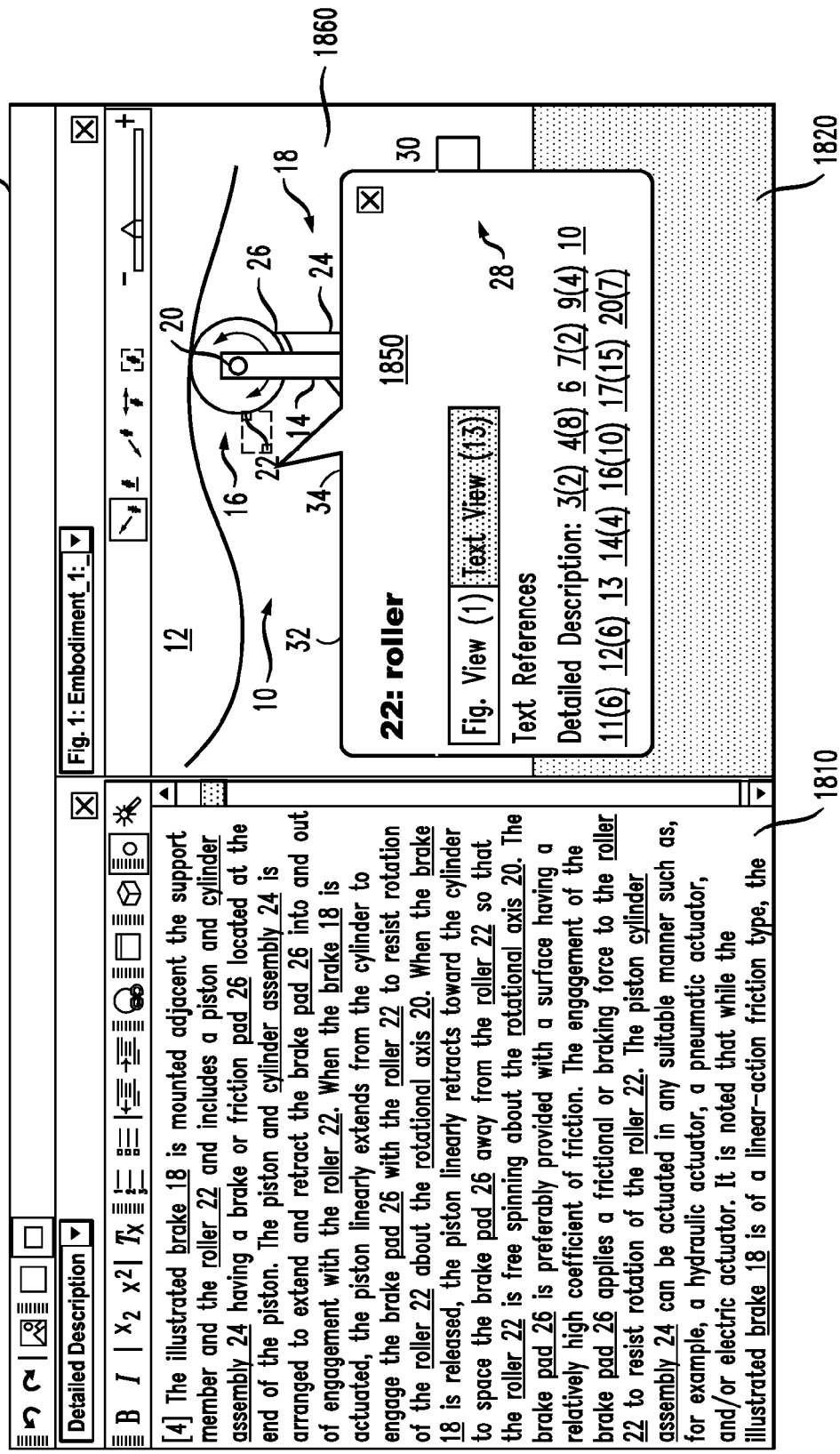

FIG. 18 illustrates an alternate view of an editing environment 1800 where a user is employing the navigation and editing tool 3300 to edit a text document in a first pane 1810 and to edit a drawing 1860 in a second pane 1820. As shown in FIG. 18, a user can activate one or more hypergraphic links, such as the hypergraphic link 1850, to view the locations of all occurrences of, for example, the controlled term "roller 22" in the text and other drawings. The example of FIG. 18 shows that "roller 22" appears in 13 paragraphs of the Detailed Description section. It appears twice in paragraph 3, eight times in paragraph 4, once in paragraph 6, and so on. The user can click on any paragraph link to launch the text editor with that section and navigate to that location.

The user can optionally upload a new drawing that replaces the underlying bitmap or vector drawing 1860 while leaving the foreground annotations. For documents intended as patent applications, this would, for example, allow a draftsperson to replace an informal drawing with a formal drawing.

Figure 19:
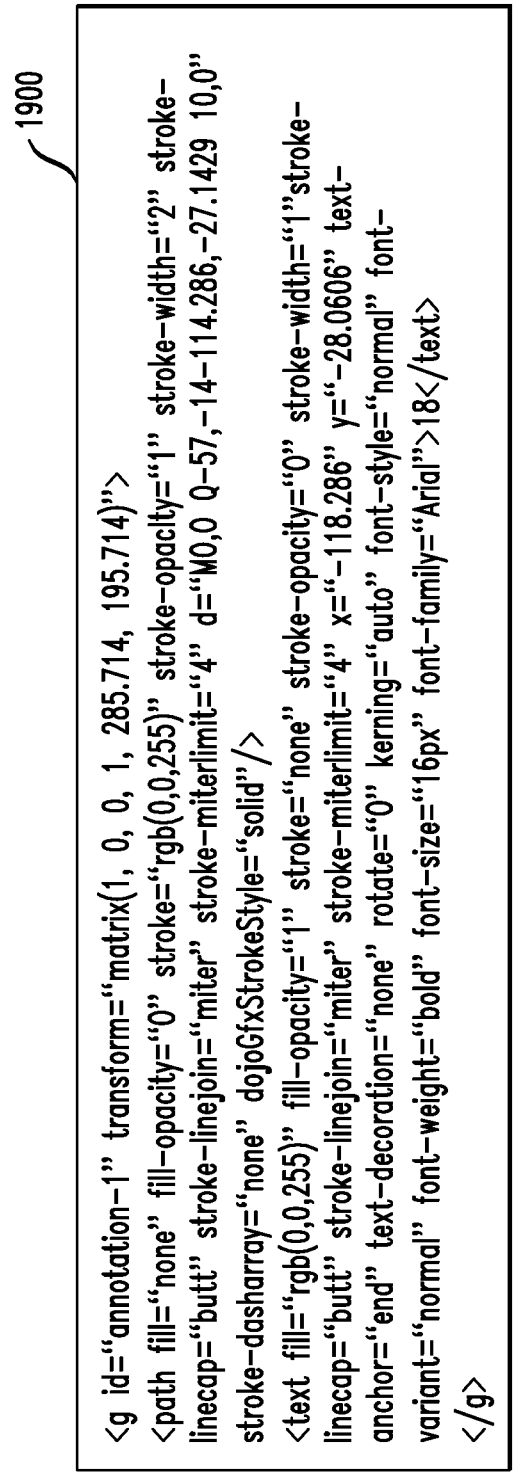
FIG. 19 illustrates an exemplary encoding of a document object for an exemplary callout "plunger 18" with a lead line.

Drawing callouts can be stored in the document object in a similar manner to how tokens are tagged in the text editor. FIG. 19 illustrates an exemplary encoding of a document object 1900 for the callout "plunger 18" with a lead line. In this implementation, only the callout number, "18" (but not the term label, e.g., "plunger") is embedded in the object because the label is shown only when the user clicks on the callout (at which time, it is requested, for example, from a server). In another embodiment, the term label would also be stored in the document object for faster display. This exemplary format uses SVG since the example is collected from a Firefox implementation. On Internet Explorer, the callout object is stored in VML (and converted to SVG when collaborating with others).

Associating Figure With Text Range

Figure tokens, such as "FIG. 1," are a token subtype (similar to element tokens discussed above). Activating a figure token 2010 optionally displays, for example, in a clickover 2000, shown in FIG. 20, information about the figure token and/or navigation links to other instances of the corresponding figure token and to the figure itself. Optionally, the figure itself may likewise be activated to display information about navigation links to figure tokens that point at the figure. This many-to-many correspondence makes it similar to element tokens and dissimilar from conventional hyperlinks that have a single destination. If there are only two instances of a token, they are bidirectional (one-to-one) which, for the purposes of this invention, is a type of many-to-many tokens.

The navigation and editing tool 3300 can optionally be configured to display the most relevant figure to a given text range in an accessory pane, in a similar manner to the text and figure presented in separate panes in FIG. 18. One embodiment of this approach parses the document above the current insertion point (in the case of a text editor) and finds the first previous figure token if one exists and displays the corresponding figure in the accessory pane. If there is no previous figure token before the current insertion point (e.g., the user is editing near the beginning of the document) a default figure can optionally be displayed (e.g., a representative drawing). A more complex embodiment can use semantic analysis to determine the actual figure token described in that text region. Consider, for example, a paragraph beginning with, "FIG. 2 illustrates a variation of the massage device of FIG. 1." Although the paragraph's text is related to FIG. 2, an algorithm searching for the most-recently mentioned figure token will display FIG. 1 while the user's insertion point is in this text region. Likewise, the sentence structure " . . . are discussed in further detail with reference to FIGS. 2A and 2B" presents similar challenges. An analysis of similar documents (e.g., if the document is a patent application, an analysis of published patents) can provide a significant corpus of figure reference language. If a human specifies which figure these examples introduce, a semantic programming expert can devise a system to parse future figure references with greater accuracy, as would be apparent to a person of ordinary skill in the art.

When the user focuses attention on an element token, for example, by clicking on the token, mousing over the token, or placing a text insertion point close to the token, the system may then display the most appropriate figure. For example, if the user mouses over the token "manual control device 42," a term which appears, for example, in FIGS. 1 and 2, the system may determine that the paragraph this instance appears in, discusses FIG. 2 so it would be most appropriate to display FIG. 2. If a text range discusses multiple figures, for example a paragraph beginning with "FIGS. 2 and 3 illustrate another embodiment . . . ", clicking on "manual control device 42" would display FIG. 2 because this controlled term does not appear in FIG. 3.

Globally Modifiable Tokens

Figure 21A:
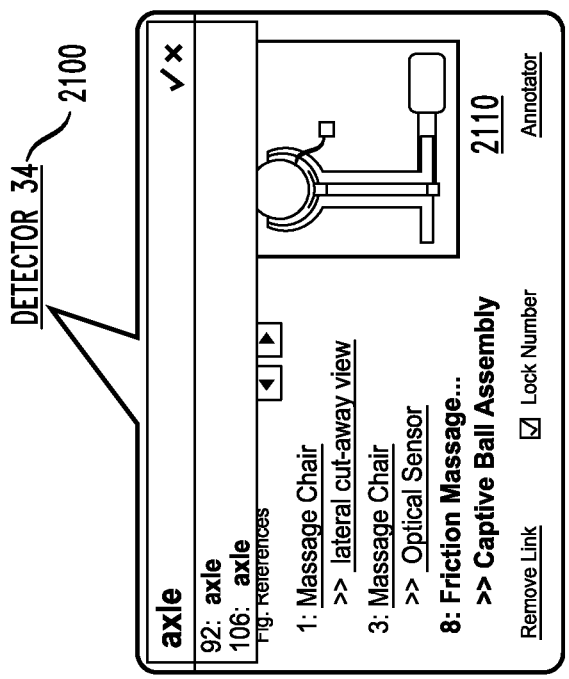
FIGS. 21A and 21B illustrate the modification of a token name and/or token number using the navigation and editing tool.
Figure 21B:
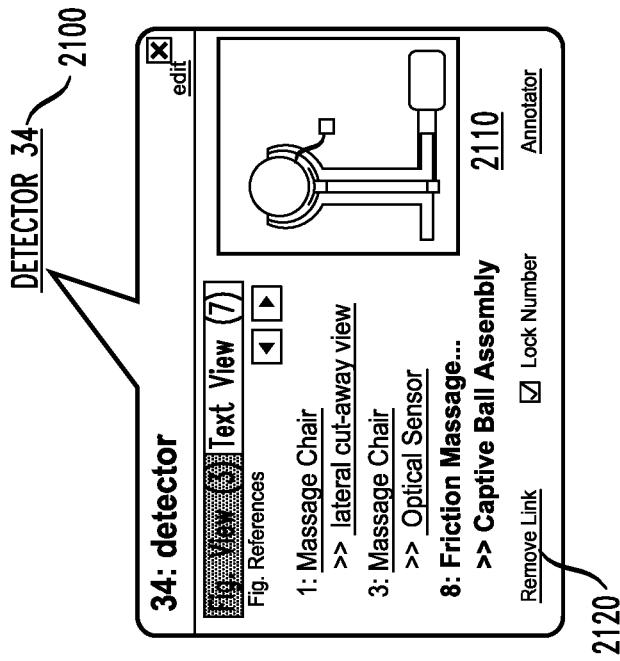

Activating a token as either a hypertext link in the text or as a callout or hypergraphic link on a drawing allows the user to edit the token name and/or number. FIGS. 21A and 21B illustrate the modification of a token 2100. As shown in FIG. 21A, the user has clicked on link 2100 associated with a token, "detector 34." As a result, a clickover 2110 indicates that this reference number is used in FIGS. 1, 3 and 8 of the exemplary patent application. The user can click on the token number, token name, or on the edit link to reveal an edit box, allowing the user to type another token name and/or number. In FIG. 21B, the user has replaced the detector label with the word "axle." The navigation and editing tool 3300 responds by listing tokens that match this token entry. The user can specify one of these preexisting tokens or create a new one. If the user enters "axle" as shown in FIG. 21B, in one embodiment, the user can press enter to create an unnumbered token. In another embodiment, the system can automatically assign a number to the token with a number that is not currently used in the document, as would be apparent to a person of ordinary skill in the art. For example, if the largest number in use in the document is 34, the label "axle" could be automatically assigned the number 36. If there are multiple instances of "detector 34" when the user renames it to axle, the system can ask the user whether to rename all instances or just this one.

It is noted that the clickovers 2110 shown in FIGS. 21A and 21B can optionally be extended to allow the user to automatically and globally modify the extent of a controlled term, in the manner described above. For example, the clickovers 2110 can include left and right arrows that correspond to functions to expand and contract the extent of the controlled term.

Instead of renaming, the user could instead activate a function 2120 to "remove link" which "detokenizes" the term "detector 34" and leaves it as plain text. This can be useful when the editor mistakenly interprets text as a token. For example, in this present patent application, it may be desirable to leave "detector 34" as plaintext because it is not necessarily a reference number in this application.

According to another aspect of the invention, the user can modify all instances of a token "class" that has variants. Tokens can be divided into subfields such as, in the case of patent applications, number and label. Note that for patent applications, all instances of a token class share the same number (e.g., "plunger 12" is unrelated to "plunger 10"). If the user modifies only a subfield which is invariant across all instances (or otherwise changes an invariant subfield which can be automatically distinguished from varying subfields), the varying subfields can be left as is while the invariant subfield is modified. For example, if the user starts with the text fragment 500 of FIG. 5 and renames the token "manual control device 42" to "manual control device 18," a dialog box 2200 such as shown in FIG. 22 is optionally presented to the user, displaying all suggested result mappings, grouped by instance variance. The manually renamed instance variant type is shown in the first row and the user can select "rename just this instance" to leave the other variants unchanged. Alternatively, the user can select/unselect which mappings should be applied and/or edit the result mappings for some by clicking on and editing the result fields.

However, if the user changes a subfield that varies across the token class (such as changing the name when there are instances that vary in capitalization, pluralization, and possessive case) and wants the renaming to apply to all instances, the system must do additional work. This situation applies whenever the modified subfield cannot be easily distinguished from the subfields that vary. This functionality operates in a similar manner to a "find and replace" function that supports variants.

In one embodiment, the system seeks additional user input to rename the variants. For example, if the user starts with the text fragment 500 of FIG. 5 and renames "manual control device 42" to "switch 42," a dialog box 2300, such as shown in FIG. 23, is presented to the user. The dialog box 2300 can optionally display all instances grouped by variance and renamed mapping, requesting that the user manually specify the mapping for other variants if they are to be renamed. Case differences may be automatically handled as shown in FIG. 23, with the system automatically mapping "Manual control device" to "Switch." If the user's change doesn't change the initial case, then variants by default will retain their initial case. Variance result mappings labeled "<enter selection>" need to be manually specified by the user before those variants can be automatically renamed. If the user does not specify all mapped results, the user can change just some variants. Alternatively, the user can select "rename just this instance" which matches a preexisting variant or creates a new variant. A more complex alternative embodiment would use language-specific semantic analysis to suggest variant mappings, as would be apparent to a person of ordinary skill in the art.

Presentation Process

Figure 24:
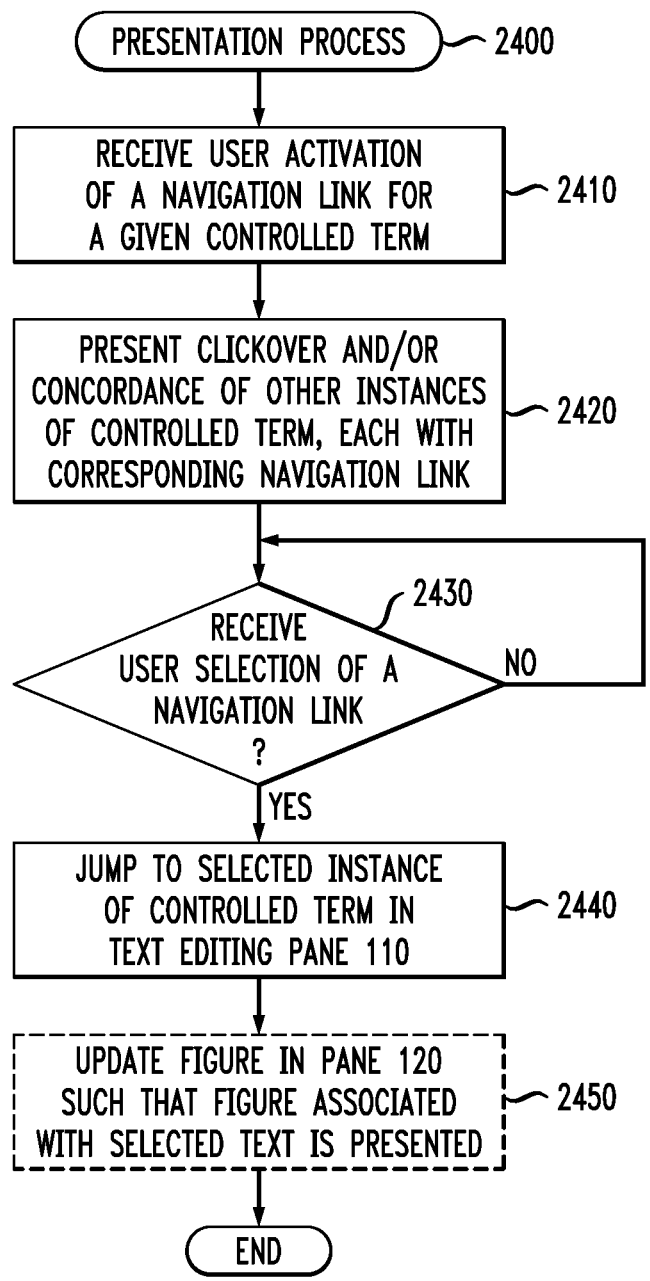
FIG. 24 is a flow chart describing an exemplary implementation of a presentation process incorporating features of the present invention.

FIG. 24 is a flow chart describing an exemplary implementation of a presentation process 2400 incorporating features of the present invention. As shown in FIG. 24, the presentation process 2400 initially receives a user activation of a navigation link for a given controlled term during step 2410 (for example, when the user points at the link). In response, the user is presented with a clickover and/or a concordance of the other instances of the controlled term, each with corresponding navigation link during step 2420. Alternatively, tokens and their corresponding navigation links may be displayed in an accessory pane 2510, as shown in FIG. 25.

A test is performed during step 2430 to determine if a user selection of a navigation link is received. Once it is determined during step 2430 that a user selection of a navigation link is received, then program control proceeds to step 2440 where the document jumps to the region of the document in the text editing pane 110 that corresponds to the selected instance of the controlled term. In addition, the figure, if any, presented in pane 120 can be updated during step 2450 such that the figure associated with the currently selected text is presented to the user, as discussed above.

If the user-selected navigation link is outside the present document, the destination document can load in the same or a different window and appropriately jump to show the destination token. If the destination token is in a figure, the figure can load in the same or a different window and appropriately pan and/or zoom to show the destination token.

Domain-Specific Rules of Good Practice

In many document domains, the documents must satisfy one or more rules that are consistent with "good practices" for the domain. When drafting a patent application, for example, it is important that (i) controlled terms in the claims section be supported by the appearance of related controlled terms in the description section and that all controlled terms are shown in the figures (otherwise, the controlled term is referred to as an "orphan"); (ii) all controlled terms in the background and description sections of a patent application should include a number (to assist, for example, with automatic tokenization); and (iii) all controlled terms in the claims should employ proper antecedent basis. Collectively, these domain-specific rules are referred to herein as "rules of good practice." The rules of good practice can be embodied, for example, in the form of a rule base, or they may be incorporated directly in the code of the navigation and editing tool 3300. As discussed hereinafter, the rules of good practice can be monitored, for example, by the sniffing process 3000 at the time of tokenization to ensure that each new token satisfies the appropriate rules. In addition, the navigation and editing tool 3300 can optionally allow a particular user to provide additional personal rules to be monitored, in addition to the default rules of good practice.

Orphans

Figure 26A:
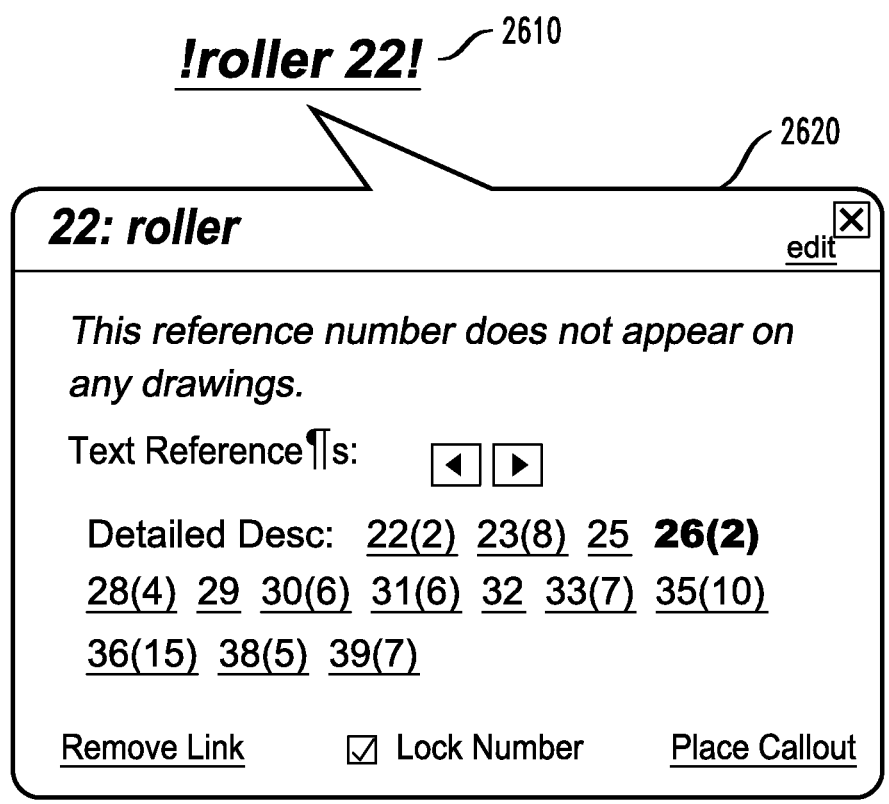
FIG. 26A illustrates a number of element tokens with a first visual indication (underlined) to indicate a valid hyperlink and a second visual indication (underlined and surrounded by exclamation marks to indicating an orphan status.
Figure 26B:
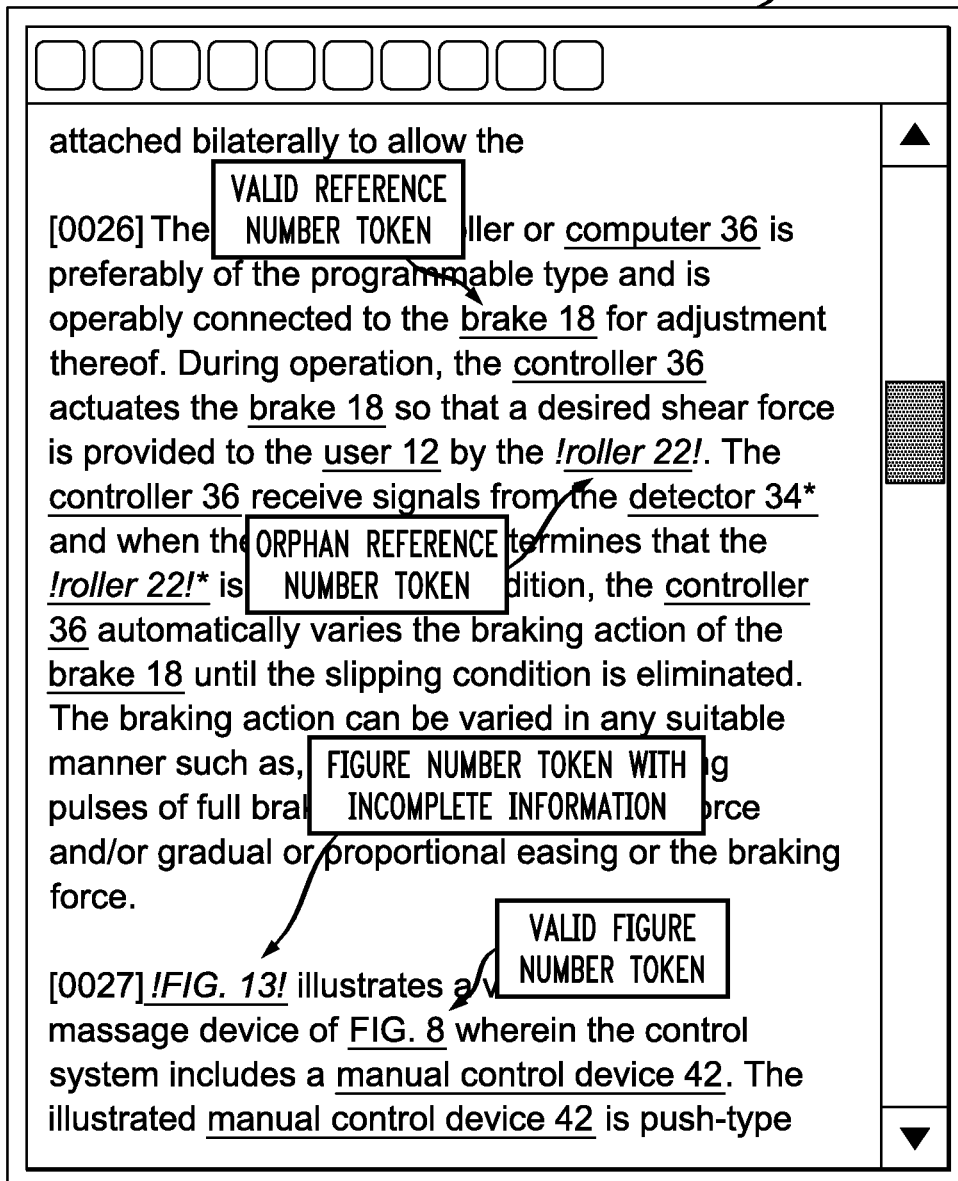
FIG. 26B provides an exemplary menu that indicates an orphan status with respect to both part tokens and figure tokens.

If a numbered element "19" token appears in the description section and there is not a corresponding callout in the drawings, this contravenes the rules of good practice and the token is called an "orphan." In order to prompt the user to correct the orphan state by either removing the element token or placing a callout in a figure, orphans can be visually distinguished from non-orphan (valid) element tokens. FIG. 26A shows some element tokens in underlined to indicate a hyperlink (valid) and some underlined and surrounded by exclamation marks (indicating orphans). Clicking on an orphan link, such as link 2610, in the text can trigger display of a clickover window 2620 explaining the cause of the error, as shown in FIG. 26A. FIG. 26B provides an exemplary menu 2650 that indicates orphan status with respect to both part tokens and figure tokens. As discussed hereinafter, the orphan status of each token can be evaluated, for example, by the sniffing process 3000 at the time of tokenization to ensure that each new token is not an orphan.

Unnumbered Element Tokens

Users may tokenize an unnumbered (or otherwise unmarked) term before entering or tokenizing a corresponding numbered (or otherwise marked) token. This may occur, for example, in a patent application, where one uses a controlled term in a claim before supporting the controlled term in the specification. This unnumbered term cannot reliably be autorecognized before the numbered term is entered because, without a number, it looks indistinguishable from surrounding text. Users may manually tokenize the unnumbered term or may sniff the document for these unnumbered terms after a related numbered term is recognized.

When a related numbered term is entered, it may be manually or automatically recognized as previously described. When a new numbered term is recognized (i.e., a term without already recognized relations), the system scans (or "sniffs") all relevant portions of the document for unrecognized related terms, including unnumbered terms. Note the system does not sniff the document for all potentially tokenizable terms. For example, if the user tokenizes an instances of a heretofore unrecognized symbol "plunger 18," the system will sniff for other occurrences of "plunger 18" (and perhaps unnumbered occurrences of "plunger") but will not sniff for "linkage 20" unless the user requests the system resniff for all possible tokens. The reason for this selectivity is that if the searching was performed for all possible tokens, plain text which was previously mistakenly automatically tokenized and then reverted to plain text will be again automatically tokenized. Reverted terms would then need to be tagged as "do not tokenize," or the system would need to maintain a dictionary of terms that are not to be tokenized. Although these are possible approaches, by restricting the sniffing algorithm to relations of the new token, the illustrative embodiment avoids requiring the user to repeat reversion instructions, doesn't require the system to tag plaintext as plaintext, and avoids the necessity of an external dictionary.

FIG. 27 provides a text fragment 2700 that demonstrates the use of two instances of unnumbered term "manual control device" in two sections of the document (Detailed Description and Claims). Neither instance is tokenized, nor can they easily be automatically recognized because no related instances are numbered or otherwise marked as a controlled term. In FIG. 28, the user adds the number "42" to the first instance in the text fragment 2800. In FIG. 29, the system automatically recognizes the numbered instance in the text fragment 2900 or the user manually tokenizes either instance. The system can then automatically recognize the additional instances such as the unnumbered term in the claims with high reliability.

Antecedent Validation

In some documents, such as patent applications, the user finds it useful to verify that terms with definite articles are correctly preceded by a related term with an indefinite article through all branches of the claim hierarchy. In a United States patent application, for example, the user enters an ordered list of claims which include unnumbered controlled terms. The claims often depend on each other in the following form:

1. An apparatus including a fragilator.
2. The apparatus of claim 1 also including a widget.
3. The apparatus of claim 2 where said widget is a sphere.
4. The apparatus of claim 1 also including two widgets.

This claim hierarchy may be outlined as follows. In an embodiment of this invention, articles preceding these controlled terms are validated as being used in the indefinite form (such as "a," "an," "one," "two," etc.) before being used in the definite form (such as "the" or "said") in each possible path through the claim tree. A claim may be said to lack clarity where the claim refers to "said widget" or "the widget," where the claim contains no earlier recitation or limitation of a widget and where it would be unclear as to what element the limitation was making reference to. In the following example, the term "apparatus" is introduced in claim 1 with the leading article "an" and has a definite form in all dependent claims ("the apparatus"). The term "widget" introduced in dependent claim 2, has an indefinite usage in claim 4 and has a definite form in dependent claim 3.

1. An apparatus including a fragilator.
2. The apparatus of claim 1 also including a widget.
3. The apparatus of claim 2 where said widget is a sphere.
4. The apparatus of claim 1 also including two widgets.

When the user misuses an article (e.g., by using a definite widget in claim 4), the navigation and editing tool 3300 can optionally indicate the error by visually highlighting the problem, for example, using red, underlined text surrounded by exclamation marks, as shown below. Clicking on the highlighted article can trigger display of a dialog (not shown)

explaining the error. The error can be dismissed in various ways including by changing the article or reordering the claim dependencies.

1. An apparatus including a fragilator.
2. The apparatus of claim 1 also including a widget.
3. The apparatus of claim 2 where said widget is a sphere.
4. The apparatus of claim 1 also including !the! widgets.

The navigation and editing tool 3300 can also track article antecedence for unrecognized terms. For example, in the following example, where the term "sphere" is unrecognized, the navigation and editing tool 3300 could still note that the term "sphere" is used indefinitely multiple times in the same claim branch. This method requires semantic analysis to distinguish elements and their determiners (e.g., definite and indefinite articles) from the surrounding text, as would be apparent to a person of ordinary skill in the art.

1. An apparatus including a fragilator.
2. The apparatus of claim 1 also including a widget which is a sphere.
3. The apparatus of claim 2 where !a! sphere is green.
4. The apparatus of claim 1 also including two widgets.

Tokenization by Sniffing

FIGS. 30A and 30B, collectively, provide illustrative pseudo-code for an exemplary implementation of a sniffing algorithm 3000 that incorporates features of the present invention. Generally, the sniffing algorithm 3000 is initiated for a user entering or modifying a region of text. As shown in FIG. 30A, the sniffing algorithm 3000 initially determines during step 3005 that an edit step is terminated by a user. Thereafter, the changed text region is parsed during step 3010 (including words immediately preceding and following the changed region (tokens recognized in preceding or following contextual text must overlap with changed region).

The sniffing algorithm 3000 looks for numbered terms during step 3015. All positive integer numbers (e.g., "52") are identified during step 3020 that are preceded by a potentially valid term name, separated by a space and followed by a non-alphanumeric character to the right.

If it is determined during step 3025 that the integer has already been recognized in a numbered symbol, then if it is determined during step 3030 that the name is the same as an already recognized term or is an automatically-recognizable variant (e.g., pluralization, capitalization, possessive), then the numbered term is tokenized and the orphan status is recalculated during step 3035. The conflict status is copied from the preexisting symbol.

If it is determined that the name preceding the number is unrelated to the preexisting symbol, then this symbol conflicts in number with another symbol. The numbered term is tokenized as "ambiguous length" during step 3045 (since "extent" of element (how many words are part of label) wasn't manually specified, may be incorrect. The system then guesses the extent of the term based on all instances but provides indication that user may want to adjust this.) During step 3050, related symbols (e.g., variants) are tokenized through the entire document. The conflicting symbols are marked as conflicting with the preexisting term during step 3055 (optionally with a visual indication help a user find inconsistent usage).

If it is determined during step 3060 that the integer hasn't yet been recognized, then the numbered term is tokenized during step 3065 as an ambiguous length (optionally with a visual indication). The numbered variants of this term are tokenized throughout the document during step 3070. The unnumbered variants of this term are then tokenized through-out the document during step 3075. Include in search text in already tokenized unnumbered terms if current search term consists of more words than previously tokenized unnumbered term. Thus, if the user first tokenizes "fuel cartridge 105", that would cause unnumbered terms "fuel cartridge" to be auto-tokenized. If the user then tokenizes "fuel cartridge communication unit 106", that will cause those previously tokenized unnumbered tokens to be reparsed to see if they're part of this longer term.

As shown in FIG. 30B, the sniffing algorithm 3000 then searches for unnumbered terms in the changed text region during step 3080. Preexisting tokens are grouped by number of words in the name during step 3084 (ignore number). For example, the numbered token "fuel cartridge communication unit 106" has four words. The unnumbered token "fuel cartridge" has two words. During step 3088, the sniffing algorithm 3000 starts with the group with the largest number of words and then iterates to smaller number of words. Note that starting with individual words and increasing extent to longer phrases won't work well since unnumbered terms should associate to longest possible match.

During step 3092, the sniffing algorithm 3000 searches for each term name and related variants (e.g., pluralization, capitalization, possessive) in text range. If found, tokenize this unnumbered term. Note that terms typically can't span paragraphs or sentences.

During step 3094, a user clicking on a term allows the user to adjust the term extent (e.g., extend selection to additional words). Alternatively, the user can untokenize and then manually tokenize the extended selection. Alternatively, if it's not supposed to be a token (e.g., "number 10 nail", "worked 3 weeks", etc), the user can untokenize the term.

During step 3096, when a user clicks on an ambiguous length token and changes the length, the sniffing algorithm 3000 searches for all instances of this term including unnumbered token text and a similar adjustment is applied. Include text in already tokenized unnumbered terms if current search term consists of more words than such previously tokenized unnumbered terms.

During step 3098, when a user clicks on an unnumbered token (which is tagged with a separate class from whatever numbered tokens it might match), show all related numbered symbols.

Miscellaneous Issues

Renumbering

The navigation and editing tool 3300 may reorder numbered element tokens either automatically or when initiated by user. Different document types will benefit from different ordering schemes. For example, a patent application passage beginning in the state 3100 shown in FIG. 31, may be transposed by automatic reordering to the state 3200 shown in FIG. 32. The numbers of initial occurrences of controlled terms increase monotonically. By starting at 20, the numbers are less likely to intersect with figure numbers and the starting number may be increased if there are more than 20 figures. Numbers may optionally increment by two instead of by one (this was done historically to allow insertion of reference numbers and although this may no longer be necessary due to this type of automatic reordering feature).

System Issues

FIG. 33 is a block diagram of a navigation and editing tool 3300 that can implement the processes of the present invention. As shown in FIG. 33, memory 3330 configures the processor 3320 to implement the navigation and editing methods, steps, and functions disclosed herein. For example, as shown in FIG. 33, the memory 3330 includes the controlled term list presentation process 1300, the presentation process 2400 and the sniffing algorithm 3000, each discussed above in conjunction with FIGS. 13, 24 and 30, respectively. The memory 3330 also includes document editing and navigation tools 3350, such as a commercially available text editor, drawing annotator and/or browser.

The memory 3330 could be distributed or local and the processor 3320 could be distributed or singular. The memory 3330 could be implemented as an electrical, magnetic or optical memory, or any combination of these or other types of storage devices. It should be noted that each distributed processor that makes up processor 3320 generally contains its own addressable memory space. It should also be noted that some or all of computer system 200 can be incorporated into a personal computer, laptop computer, handheld computing device, application-specific circuit or general-use integrated circuit.

The navigation and editing tool 3300 optionally employs a remote storage device 3355, such as a document server. The exemplary remote storage device 3355 stores a document database 3370, domain-specific rules of good practice 3380, and domain-specific relation rules 3390. Generally, the document database 3370 records the one or more documents that are edited and/or navigated in accordance with the present invention. The exemplary domain-specific rules of good practice 3380 record the rules of good practice discussed herein. The exemplary domain-specific relation rules 3390 store the relation rules described herein that are appropriate for the document domain. The relation rules 3390 can specify whether different occurrences of terms with minor variations should be treated as the same symbol or a separate symbol. The relation rules 3390 can specify whether unnumbered variants of numbered terms should be treated as the same symbol, a separate symbol, or a superset encompassing the numbered term.

As previously indicated, the exemplary navigation and editing tool 3300 may be any standalone, client-server, or peer-to-peer-based text and/or drawing editor or browser, as would be apparent to a person of ordinary skill in the art.

CONCLUSION

While a number of figures show an exemplary sequence of steps, it is also an embodiment of the present invention that the sequence may be varied. Various permutations of the algorithm are contemplated as alternate embodiments of the invention.

While exemplary embodiments of the present invention have been described with respect to digital logic blocks, as would be apparent to one skilled in the art, various functions may be implemented in the digital domain as processing steps in a software program, in hardware by circuit elements or state machines, or in combination of both software and hardware. Such software may be employed in for example, a digital signal processor, micro-controller, or general-purpose computer. Such hardware and software may be embodied within circuits implemented within an integrated circuit.

Thus, the functions of the present invention can be embodied in the form of methods and apparatuses for practicing those methods. One or more aspects of the present invention can be embodied in the form of program code, for example, whether stored in a storage medium, loaded into and/or executed by a machine, or transmitted over some transmission medium, wherein, when the program code is loaded into and executed by a machine, such as a computer, the machine becomes an apparatus for practicing the invention. When implemented on a general-purpose processor, the program code segments combine with the processor to provide a device that operates analogously to specific logic circuits.

System and Article of Manufacture Details

As is known in the art, the methods and apparatus discussed herein may be distributed as an article of manufacture that itself comprises a computer readable medium having computer readable code means embodied thereon. The computer readable program code means is operable, in conjunction with a computer system, to carry out all or some of the steps to perform the methods or create the apparatuses discussed herein. The computer readable medium may be a recordable medium (e.g., floppy disks, hard drives, compact disks, memory cards, semiconductor devices, chips, application specific integrated circuits (ASICs)) or may be a transmission medium (e.g., a network comprising fiber-optics, the worldwide web; cables, or a wireless channel using time-division multiple access, code-division multiple access, or other radio-frequency channel). Any medium known or developed that can store information suitable for use with a computer system may be used. The computer-readable code means is any mechanism for allowing a computer to read instructions and data, such as magnetic variations on a magnetic media or height variations on the surface of a compact disk.

The computer systems and servers described herein each contain a memory that will configure associated processors to implement the methods, steps, and functions disclosed herein. The memories could be distributed or local and the processors could be distributed or singular. The memories could be implemented as an electrical, magnetic or optical memory, or any combination of these or other types of storage devices. Moreover, the term "memory" should be construed broadly enough to encompass any information able to be read from or written to an address in the addressable space accessed by an associated processor. With this definition, information on a network is still within a memory because the associated processor can retrieve the information from the network.

It is to be understood that the embodiments and variations shown and described herein are merely illustrative of the principles of this invention and that various modifications may be implemented by those skilled in the art without departing from the scope and spirit of the invention.

I claim:

1. A method for navigating among a plurality of occurrences of a controlled term in one or more documents, said method comprising the steps of:
 providing a link for each of said occurrences of said controlled term, wherein each of said links include a plurality of destination links, wherein each of said destination links allow a user to navigate to a corresponding one of the other of said plurality of occurrences in said one or more documents;
 receiving a user selection of at least one of said destination links; and
 jumping, in response to said user selection, to a destination in said one or more documents associated with said selected destination link.

2. The method of claim 1, wherein said one or more documents comprise at least one text document and at least one drawing document.

3. The method of claim 2, wherein said at least one text document includes at least one of said occurrences of said controlled term and wherein said at least one drawing includes at least one additional occurrence of said controlled term, and wherein said method further comprises the step of jumping between said at least one occurrence in said at least one text document and said at least one occurrence in said at least one drawing.

4. The method of claim 2, wherein at least a portion of said at least one text document is mapped to a corresponding one of said at least one drawing such that a version of said at least one corresponding drawing is presented to said user upon a focus on said portion by said user.

5. The method of claim 2, wherein a user selection of said link for a given occurrence of said controlled term causes a version of a corresponding drawing document to be presented to said user.

6. The method of claim 5, wherein said given occurrence of said controlled term is a drawing token and wherein said corresponding drawing document is a drawing identified by said drawing token.

7. The method of claim 5, wherein said given occurrence of said controlled term is an element token and wherein said corresponding drawing document is a drawing containing an element associated with said element token.

8. The method of claim 7, wherein said presented version of said drawing containing said element associated with said element token deemphasizes elements in said drawing other than said selected element.

9. The method of claim 1, wherein said jumping step further comprises the step of adjusting a focus of at least one of said one or more documents to a region of said at least one document containing an occurrence of said controlled term identified by said selected destination link.

10. The method of claim 1, further comprising the step of, in response to a user activating one of said links, presenting said user with a list of said other of said plurality of occurrences in said one or more documents associated with said activated link.

11. The method of claim 10, wherein said presented list groups said occurrences into at least two variant types.

12. The method of claim 1, wherein each of said plurality of occurrences of a controlled term are tokenized.

13. The method of claim 12, wherein each of said tokenized occurrences of said controlled term have a common token identifier.

14. The method of claim 12, wherein token boundaries of each of said tokenized occurrences of said controlled term are associatively saved with said one or more documents.

15. The method of claim 14, further comprising the step of persistently storing said token boundaries for each of said controlled terms between at least two sessions.

16. The method of claim 12, wherein token boundaries of each of said tokenized occurrences of said controlled term are stored as metadata in said one or more documents.

17. The method of claim 12, wherein at least one of said tokenized occurrences of said controlled term are identified using a sniffing process.

18. The method of claim 12, wherein at least one of said tokenized occurrences of said controlled term is automatically identified and wherein said method further comprises the step of receiving a user manual adjustment of an extent of said automatically identified tokenized occurrence.

19. The method of claim 12, further comprising the step of receiving a user request to de-tokenize at least one of said tokenized occurrences of said controlled term.

20. The method of claim 12, further comprising the steps of receiving a user request to edit at least one of said tokenized occurrences of said controlled term and updating, in response to said user request, each of said additional occurrences of said controlled term based on said edit.

21. The method of claim 20, wherein said step of updating, in response to said user request, further comprises the step of allowing said user to selectively edit variant usages for one or more of said additional occurrences of said controlled term.

22. The method of claim 1, wherein said plurality of occurrences of said controlled term includes one or more predefined variant uses of said controlled term.

23. The method of claim 1, wherein a given one of said links associated with a first occurrence of said controlled term and said plurality of destination links associated with said given link are bidirectional, such that activating a link associated with an occurrence identified by one of said plurality of destination links includes a link back to said first occurrence.

24. The method of claim 1, wherein a given one of said links associated with a first occurrence of said controlled term and said plurality of destination links associated with said given link are bidirectional, such that activating a link associated with an occurrence identified by one of said plurality of destination links provides information about a location of said first occurrence.

25. The method of claim 1, wherein said links comprise one or more of hyperlinks and hypergraphic links.

26. The method of claim 1, further comprising the step of inserting at least one occurrence of said controlled terms in said one or more documents from a list of said controlled terms in response to a user request.

27. The method of claim 26, further comprising the step of filtering said list to match user-specified text.

28. The method of claim 1, further comprising the step of evaluating said occurrences of said controlled term to determine if one or more predefined rules of good practice are satisfied.

29. The method of claim 28, further comprising the step of providing a visual indicator if one of said controlled terms violates one or more of said predefined rules of good practice.

30. The method of claim 28, wherein said one or more documents comprise one or more patent-related documents.

31. The method of claim 30, wherein said predefined rules of good practice ensure that said controlled term is not an orphan term.

32. The method of claim 30, wherein said predefined rules of good practice ensure that each of said controlled terms in a claims portion of a patent application employ proper antecedent basis.

33. The method of claim 1, wherein one or more of said occurrences of said controlled term includes a reference number and wherein said method further comprises the step of automatically renumbering at least one of said reference numbers.

34. The method of claim 33, wherein said step of renumbering at least one of said reference numbers further comprises the step of renumbering said reference numbers in increasing order.

35. The method of claim 33, wherein said step of renumbering at least one of said reference numbers is responsive to one or more of a controlled term or a drawing being deleted or inserted.

36. The method of claim 1, wherein said link and said corresponding plurality of destination links comprise a many-to-many navigation link.

37. The method of claim 1, wherein said plurality of occurrences of a controlled term are maintained in relationship to each other.

38. The method of claim 1, further comprising the step of determining if an unmarked term is one or more of a same symbol or a superclass encompassing one or more marked occurrences of said controlled term.

39. The method of claim 1, further comprising the step of receiving a user instruction to explicitly relate two terms as related occurrences of a controlled term.

40. The method of claim 39, wherein at least one of said two terms comprises one or more of an acronym and parenthetical information.

41. The method of claim 1, further comprising the step of receiving a user instruction to explicitly relate two terms hierarchically.

42. The method of claim 1, wherein at least one of said plurality of destination links provides a visual indication of one of said occurrences that is in focus.

43. The method of claim 1, wherein said one or more documents comprise a drawing document having a drawing and one or more overlaid drawing tokens and wherein said method further comprises the steps of replacing said drawing with another drawing and maintaining said one or more overlaid drawing tokens.

44. An apparatus for navigating among a plurality of occurrences of a controlled term in one or more documents, the apparatus comprising:
- a memory; and
- at least one processor, coupled to the memory, operative to:
  - provide a link for each of said occurrences of said controlled term, wherein each of said links include a plurality of destination links, wherein each of said destination links allow a user to navigate to a corresponding one of the other of said plurality of occurrences in said one or more documents;
  - receive a user selection of at least one of said destination links; and
  - jump, in response to said user selection, to a destination in said one or more documents associated with said selected destination link.

45. An article of manufacture for navigating among a plurality of occurrences of a controlled term in one or more documents, comprising a tangible machine readable recordable medium containing one or more programs which when executed implement the steps of:
- provide a link for each of said occurrences of said controlled term, wherein each of said links include a plurality of destination links, wherein each of said destination links allow a user to navigate to a corresponding one of the other of said plurality of occurrences in said one or more documents;
- receive a user selection of at least one of said destination links; and
- jump, in response to said user selection, to a destination in said one or more documents associated with said selected destination link.

* * * * *